US009683521B2

(12) United States Patent
Mahalatkar et al.

(10) Patent No.: US 9,683,521 B2
(45) Date of Patent: Jun. 20, 2017

(54) THERMAL ABATEMENT SYSTEMS

(71) Applicant: Eaton Corporation, Cleveland, OH (US)

(72) Inventors: Kartikeya K Mahalatkar, Pune (IN); Matthew G. Swartzlander, Battle Creek, MI (US); Sheetalkumar Patil, Pune (IN); Michael J. Froehlich, Farmington Hills, MI (US); Gopal Kishanrao Kulkarni, Pune (IN); Michael Ernest Coates, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/699,113

(22) Filed: Apr. 29, 2015

(65) Prior Publication Data

US 2016/0047340 A1 Feb. 18, 2016

Related U.S. Application Data

(63) Continuation-in-part of application No. PCT/US2014/063439, filed on Oct. 31, 2014, which
(Continued)

(30) Foreign Application Priority Data

Aug. 18, 2014 (IN) ............................ 2337/DEL/2014

(51) Int. Cl.
*F01C 1/08* (2006.01)
*F02M 25/07* (2006.01)
(Continued)

(52) U.S. Cl.
CPC ......... *F02M 25/0727* (2013.01); *F02B 33/38* (2013.01); *F02M 26/08* (2016.02); *F04C 18/126* (2013.01); *Y02T 10/121* (2013.01)

(58) Field of Classification Search
CPC ........ F01C 21/10; F04C 18/126; F04C 18/15; F04C 29/042; F04C 18/084; F04C 29/122
(Continued)

(56) References Cited

U.S. PATENT DOCUMENTS 2,489,887 A 11/1949 Houghton
2,906,448 A 9/1959 Lorenz
(Continued)

FOREIGN PATENT DOCUMENTS

DE 2027272 A1 12/1971
FR 778361 3/1935
(Continued)

OTHER PUBLICATIONS 2.6.1 Design / Operating principle, Roots vacuum pumps, Pfeiffer Vacuum, http://www.pfeiffer-vacuum.com/know-how/vacuum-generation/roots-vacuum-pumps/technology.action?chapter=tec2.6, downloaded Aug. 18, 2014, pp. 1-5.
(Continued)

*Primary Examiner* — Thomas Moulis
(74) *Attorney, Agent, or Firm* — Mei & Mark LLP

(57) ABSTRACT

A thermal abatement system comprises an axial inlet, radial outlet supercharger. A main case comprises at least two rotor bores, an inlet plane and an outlet plane. The inlet plane is perpendicular to the outlet plane. An inlet wall comprises an inner surface. Two rotor mounting recesses are in the inner surface, and the inlet wall is parallel to the inlet plane. An outlet is in the outlet plane. An inlet is in the inlet plane. At least two rotors are configured to move air from the inlet to the outlet. The main case comprises at least two backflow
(Continued)

ports. An intercooler is connected to receive air expelled from the supercharger, to cool the received air, and to expel the cooled air to the at least two back flow ports.

34 Claims, 22 Drawing Sheets

Related U.S. Application Data is a continuation-in-part of application No. 29/499,660, filed on Aug. 18, 2014.

(60) Provisional application No. 61/986,081, filed on Apr. 29, 2014, provisional application No. 61/897,928, filed on Oct. 31, 2013, provisional application No. 61/991,166, filed on May 9, 2014.

(51) Int. Cl.
  *F04C 18/12* (2006.01)
  *F02B 33/38* (2006.01)
  *F02M 26/08* (2016.01)

(58) Field of Classification Search
  USPC ........ 123/559.1, 559.2, 562–564; 418/201.1, 418/206, 206.1, 206.3, 206.4
  See application file for complete search history.

(56) References Cited

U.S. PATENT DOCUMENTS

| | | | |
|---|---|---|---|
| 3,531,227 A | 9/1970 | Weatherston | |
| 3,575,535 A | 4/1971 | Bickar | |
| 4,062,199 A | 12/1977 | Kasahara et al. | |
| 4,553,911 A | 11/1985 | Pillis | |
| 4,569,646 A | 2/1986 | Soeters, Jr. | |
| 4,859,158 A | 8/1989 | Weinbrecht | |
| 4,995,347 A * | 2/1991 | Tate ................. | F02B 33/446 123/559.1 |
| 4,995,796 A | 2/1991 | Kambe et al. | |
| 5,078,583 A | 1/1992 | Hampton et al. | |
| 5,083,907 A | 1/1992 | Brownell | |
| 5,090,879 A | 2/1992 | Weinbrecht | |
| 5,118,268 A | 6/1992 | Crisenbery et al. | |
| 5,127,386 A * | 7/1992 | Sowards ............. | F02B 33/36 123/564 |
| 5,439,358 A | 8/1995 | Weinbrecht | |
| 5,527,168 A | 6/1996 | Juday | |
| 5,819,538 A | 10/1998 | Lawson, Jr. | |
| 6,203,297 B1 | 3/2001 | Patel | |
| 6,312,240 B1 | 11/2001 | Weinbrecht | |
| 6,324,848 B1 * | 12/2001 | Gladden ............. | F02B 37/013 123/559.1 |
| 6,343,473 B1 | 2/2002 | Kanesaka | |
| 6,589,034 B2 | 7/2003 | Vorwerk et al. | |
| 6,874,486 B2 | 4/2005 | Prior et al. | |
| 7,100,584 B1 * | 9/2006 | Bruestle ............. | F02B 29/0418 123/563 |
| 7,226,280 B1 | 6/2007 | Yokoi et al. | |
| 7,488,164 B2 | 2/2009 | Swartzlander | |
| 7,529,614 B1 * | 5/2009 | Muller ................. | F02B 37/16 123/559.1 |
| 7,779,822 B2 | 8/2010 | Prior et al. | |
| 7,866,966 B2 | 1/2011 | Swartzlander | |
| 7,950,911 B2 | 5/2011 | Ohtsuka et al. | |
| 8,434,305 B2 * | 5/2013 | Donkin ............... | F02B 21/00 123/559.1 |
| 8,539,769 B2 * | 9/2013 | Hansen ............... | F01C 11/008 123/559.1 |
| 8,632,324 B2 | 1/2014 | Swartzlander | |
| D718,043 S | 11/2014 | Hamburger | |
| D732,081 S | 6/2015 | Northrop et al. | |
| 2003/0039568 A1 | 2/2003 | Vorwerk et al. | |
| 2003/0192503 A1 | 10/2003 | James | |
| 2004/0194766 A1 | 10/2004 | Prior et al. | |
| 2006/0263230 A1 | 11/2006 | Swartzlander | |
| 2008/0060622 A1 | 3/2008 | Prior | |
| 2008/0168961 A1 | 7/2008 | Prior et al. | |
| 2008/0170958 A1 | 7/2008 | Prior et al. | |
| 2008/0271719 A1 | 11/2008 | Prior | |
| 2009/0004038 A1 | 1/2009 | Prior et al. | |
| 2009/0148330 A1 | 6/2009 | Swartzlander | |
| 2010/0086402 A1 | 4/2010 | Ouwenga et al. | |
| 2011/0058974 A1 | 3/2011 | Swartzlander | |
| 2011/0150671 A1 | 6/2011 | Ouwenga | |
| 2014/0017101 A1 | 1/2014 | Staley | |
| 2014/0193285 A1 | 7/2014 | Swartzlander | |
| 2015/0118086 A1 | 4/2015 | Swartzlander | |
| 2015/0252719 A1 | 9/2015 | Pryor et al. | |
| 2015/0377158 A1 | 12/2015 | Benjey et al. | |
| 2016/0003129 A1 | 1/2016 | Swartzlander et al. | |
| 2016/0003249 A1 | 1/2016 | Ouwenga et al. | |
| 2016/0003250 A1 | 1/2016 | McWilliams et al. | |
| 2016/0047340 A1 | 2/2016 | Mahalatkar et al. | |

FOREIGN PATENT DOCUMENTS

| | | |
|---|---|---|
| GB | 282752 | 5/1928 |
| JP | 11-294175 A | 10/1999 |

OTHER PUBLICATIONS

International Search Report and Written Opinion, PCT/US2014/063439, mailed Feb. 17, 2015, pp. 1-9.

Welabrecht, John E., "The High-Ratio Circulating Compressor," International Compressor Engineering Conference, 1988, p. 1-9, Paper 644, Purdue University.

* cited by examiner

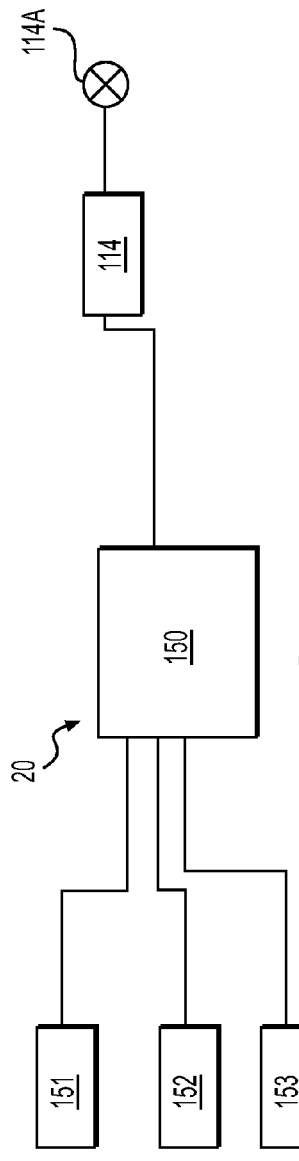
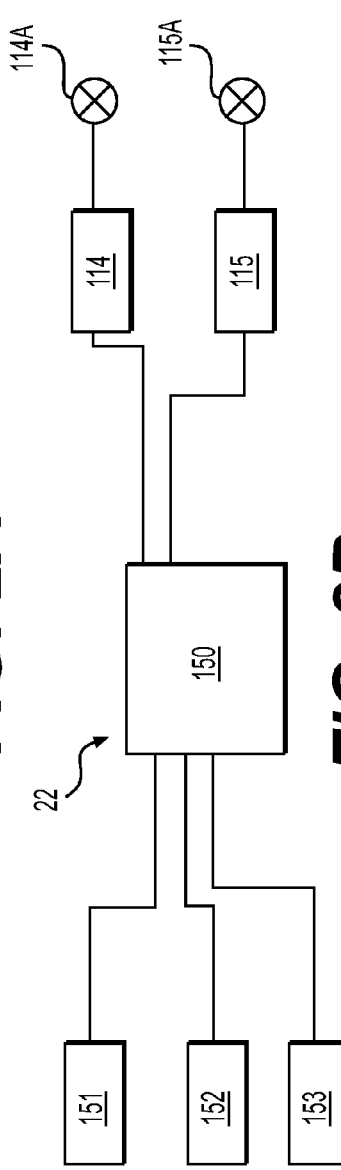
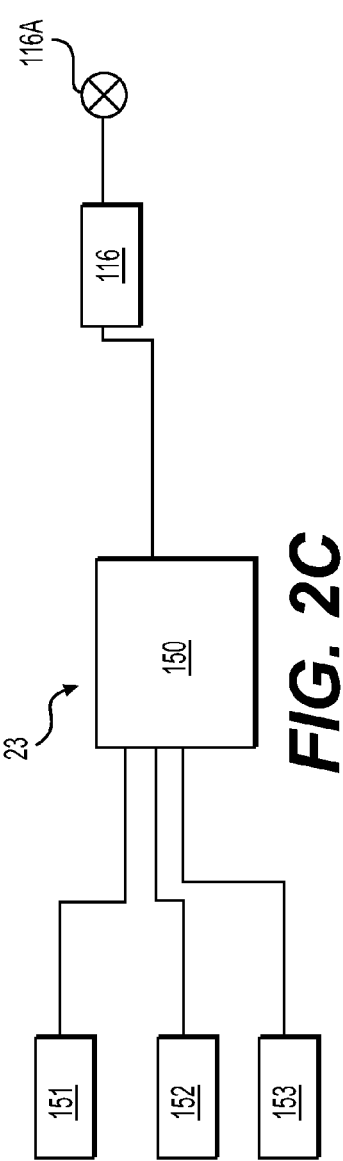

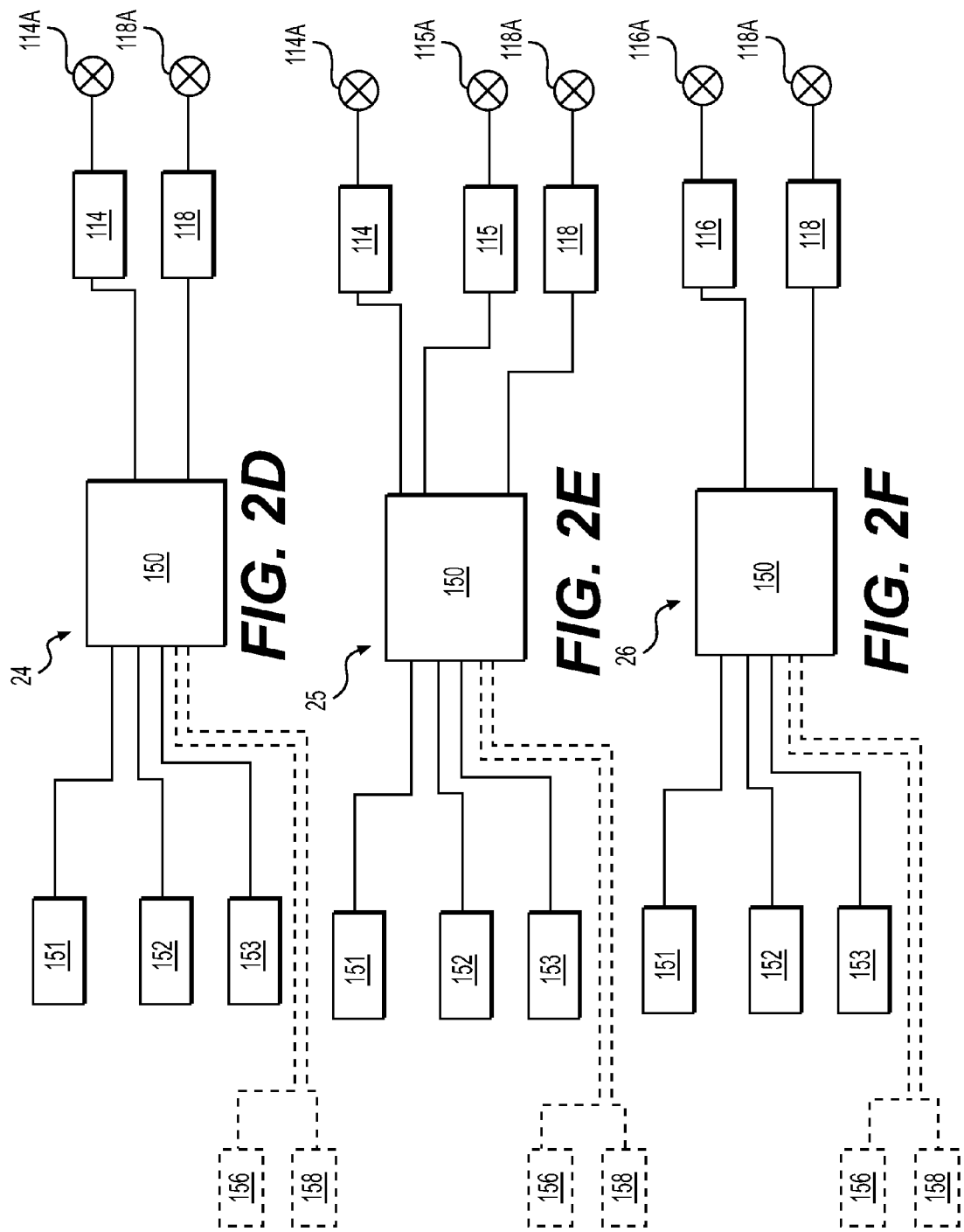

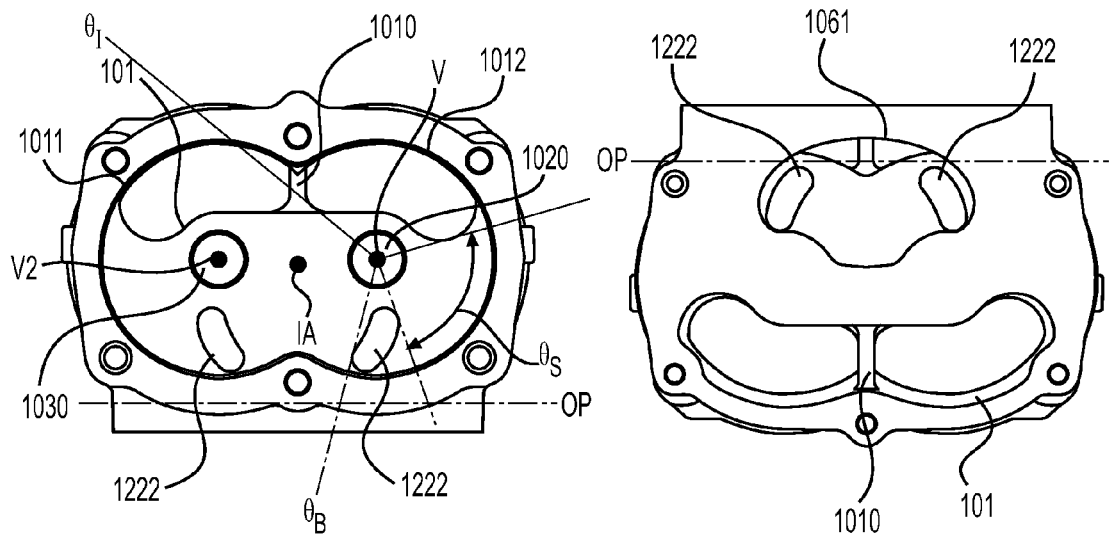
FIG. 6C  FIG. 6D
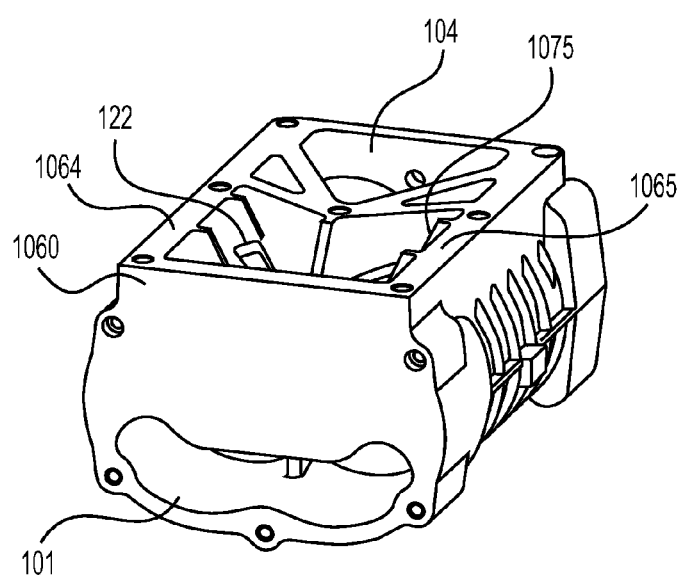
FIG. 7

THERMAL ABATEMENT SYSTEMS

PRIORITY

This application claims priority to U.S. provisional patent application 61/986,081 filed Apr. 29, 2014. This application claims priority under 35 USC 365(c) to, and is a continuation-in-part of, PCT/US2014/063439 filed Oct. 31, 2014. This application claims priority to U.S. provisional patent application 61/897,928 filed Oct. 31, 2013, U.S. provisional patent application 61/991,166 filed May 9, 2014, US Design patent application 29/499,660 filed Aug. 18, 2014, and Indian provisional patent application 2337/DEL/2014 filed Aug. 18, 2014. Each of the priority applications is incorporated herein by reference in their entirety.

TECHNICAL FIELD

The present disclosure relates generally to a supercharger system. More specifically, a supercharger system achieving a high pressure ratio and low outlet temperature by backflowing cooled air from an intercooler to the supercharger.

BACKGROUND

A supercharger can be implemented to supply compressed air to a combustion engine. When the air is compressed, then more air can be supplied, enabling a vehicle to produce more power. There are different kinds of superchargers available, including Comprex, Roots type, twin-screw, and centrifugal. They differ in the way that air is compressed and moved to the intake manifold of the engine.

The Roots type supercharger is a positive displacement pump that forces air around the outer circumference of rotors and blows the air into the manifold. Therefore, a Roots type supercharger is sometimes called a "blower." More specifically, the Roots type supercharger has two counter-rotating lobed rotors. The two rotors trap air in the gaps between rotors and push it against the housing as the rotors rotate towards the outlet/discharge port into the engine's intake manifold. By moving air into the manifold at a higher rate than the engine consumes it, pressure is built.

Because of its simple design, the Roots type supercharger is widely used. However, the Roots type supercharger has some disadvantages. When the chamber of trapped air is opened to the engine's intake manifold, the pressurized air in the engine's intake manifold reverse-flows according to thermodynamic and fluid mechanic principles into the supercharger. Further, there could be a leakage of air between the rotors due to gaps, or leakage due to gaps between the rotor lobes and housing, the gaps supplied for thermal expansion tolerances. Both reversion of air and air leakage contribute to the thermal inefficiencies of the Roots type supercharge. And, due to its nature to produce high discharge temperatures, it can take away from the engine performance. For example, when the temperature of discharged air is increased, it can cause detonation, excessive wear, or heat damage to an engine.

In many positive displacement compression devices, such as reciprocating compressors, the pressure is increased by reducing the volume occupied by gas. For example, a piston physically compresses a large volume of gas into a smaller volume to increase pressure. However in a Roots device there is no mechanism like a piston to compress the gas. The Roots blower scoops the air from a low pressure suction side and moves this air to the high pressure outlet side. When the low pressure air scooped by the Roots supercharger comes in contact with the high pressure outlet side, then a backflow event takes place whereby the high pressure gas from the outlet backflows into the supercharger to compress the low pressure gas into higher pressure gas. Thus the compression of gas in the supercharger happens through this backflow event. This also heats up the compressed low pressure gas to a higher temperature based on thermodynamic principles. After compression of the gas, the blades of the Roots supercharger squeeze the compressed air out of the supercharger into the high pressure outlet side.

Typically, Roots superchargers use hot high pressure air available at the outlet for the backflow event. However, it is possible to cool the Roots compressor by using relatively colder high pressure gas available after the intercooler. But, issues remain to determine the backflow slot sizing, placement, and geometry necessary to get an optimum backflow event that provides the lowest operating temperature for the supercharger while providing the highest operating efficiency.

SUMMARY

In an effort to increase boost, which is given in terms of pressure ratio to the engine, a high pressure ratio is needed. Pressure ratio denotes the ratio of absolute air pressure before the supercharger to the absolute air pressure after the compression inured by the supercharger. At higher pressure ratio, or boost, more air mass is delivered to the engine allowing a greater amount of fuel to be burnt as well resulting in higher power output.

A thermal abatement system comprises an axial inlet, radial outlet supercharger. A main case comprises at least two rotor bores, an inlet plane and an outlet plane. The inlet plane is perpendicular to the outlet plane. An inlet wall comprises an inner surface. Two rotor mounting recesses are in the inner surface, and the inlet wall is parallel to the inlet plane. An outlet is in the outlet plane. An inlet is in the inlet plane. At least two rotors are configured to move air from the inlet to the outlet. The main case comprises at least two backflow ports. An intercooler is connected to receive air expelled from the supercharger, to cool the received air, and to expel the cooled air to the at least two back flow ports.

A thermal abatement system comprises an axial inlet, radial outlet supercharger. A main case comprises at least two rotor bores, an inlet plane and an outlet plane. The inlet plane is perpendicular to the outlet plane. An inlet wall comprises an inner surface. Two rotor mounting recesses are in the inner surface, and the inlet wall is parallel to the inlet plane. An outlet is in the outlet plane. An inlet is in the inlet plane. At least two rotors are configured to move air from the inlet to the outlet. The main case comprises at least two backflow ports. An intercooler is connected to receive air expelled from the supercharger, to cool the received air, and to expel a selective portion of the cooled air to the at least two back flow ports. An engine is connected to receive another portion of the cooled air from the intercooler, and the engine is configured to combust the cooled air and to expel exhaust. An exhaust gas recirculation (EGR) conduit is connected to selectively receive a portion of the exhaust and is further connected to input the exhaust back in to the thermal abatement system for additional combustion.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several examples of the present teachings and together with the description, serve to explain the principles of operation.

FIGS. 2A-2F are examples of control systems.

FIG. 6A-6D are views of a supercharger main case.

FIG. 7 is a view of an alternative supercharger main case.

DETAILED DESCRIPTION

Figure 1A:
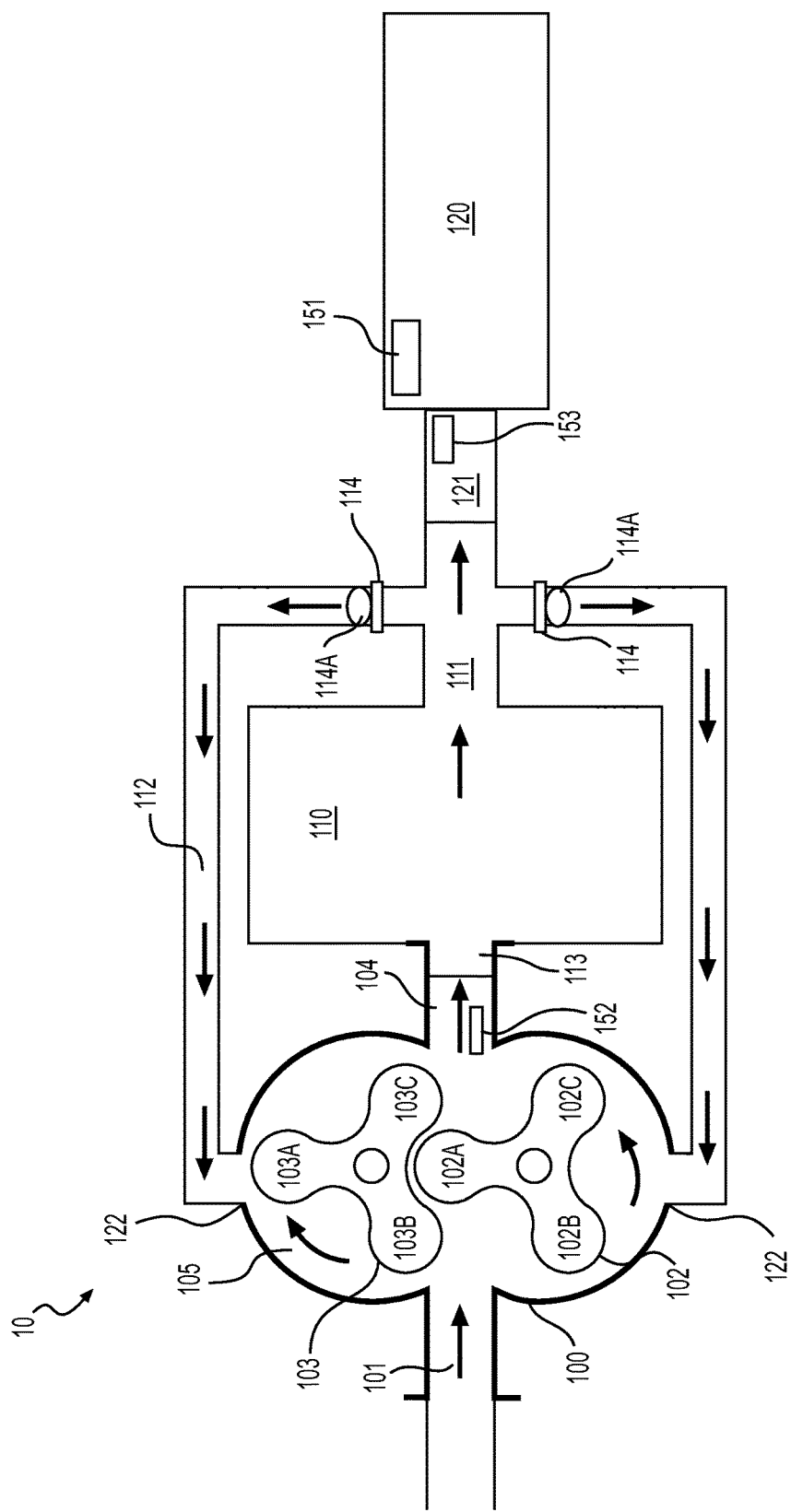
FIG. 1A is a schematic view of a supercharger system with cooled air backflow conduits.

Reference will now be made in detail to the present exemplary aspects of the present teachings, examples of which are illustrated in the accompanying drawings. Wherever possible, the same reference numbers will be used throughout the drawings to refer to the same or like parts. Bold arrow-headed lines indicate air flow direction, unless otherwise noted.

FIG. 1 shows a supercharger system 10 for controlling the outlet condition of a supercharger 100 through conditioning of the backflow air. Supercharger 100 can have an air inlet 101, a chamber 105, and an outlet 104. The supercharger system 10 is a backflow control system for controlling the backflow event to adjust the temperature at the outlet 104 of the supercharger 100. Supercharger 100 is a positive displacement air pump, and can be a Roots type, or a different type such as a screw type. When actively blowing, or pumping, air, the supercharger 100 heats air as it passes through the chamber 105. Supercharger 100 is used to compress air going to a combustion engine 120 and to increase the power output of the engine. Compression can happen as a result of high pressure outlet air back flowing into the low pressure control volume of air as the control volume is transferred to the outlet. The system 10 includes mechanisms for introducing cooled outlet air instead of hot outlet air for the backflow event.

The introduction of cooled air during backflow increases the pressure ratio of the supercharger system over prior art methods. The pressure ratio describes the amount of boost the supercharger can supply to the engine, and is the ratio of the fluid pressure before the supercharger to the fluid pressure after the supercharger. A gas, such as ambient air, is the preferred fluid for compression, though, at times, an amount of other fluid, such as exhaust, can be present due to Exhaust Gas Recirculation (EGR).

Currently, the pressure ratio of a Roots supercharger is limited by the maximum operating temperature, or thermal limit, of the device. The thermal limit is determined by factors such as oil degradation, thermal expansion of metal parts such as the rotor and/or housing, operational fatigue, and durability issues. By reducing the temperature of fluid circulating in the supercharger, the pressure ratio of the device can increase while staying within the thermal limit of the device.

Generally, to reduce the temperature of air going into the engine, an intercooler is used to cool the air from the supercharger. The reduction of air temperature will increase the density of the air, which consequently increases the engine's ability to make more horsepower and torque. By backflowing cooled air from the intercooler to the supercharger, the pressure ratio of the supercharger increases while reducing the temperature of the discharged air from the supercharger 100.

In FIG. 1, the air inlet 101 allows ambient air to come into the supercharger 100. The air inlet 101 is located on the tubular housing in an inlet plane IP at an inlet side of the supercharger 100. The inlet 101 can comprise a crescent shape or other shape. An outer edge of the inlet 101 shape can be parallel to, or congruous with, the shape of the rotor bores. The chamber 105 can comprise two rotor bores containing two rotors 102, 103. Each rotor rotates about an axis parallel to a first axis, or inlet axis IA. Each rotor can have at least two lobes, but preferably, three or four. Rotor 102 has three lobes, 102A, 102B, and 102C. Similarly, rotor 103 has three lobes, 103A, 103B, and 103C. The lobes can be parallel or twisted. For an example of the twisted design, the rotors can be either hi-helix type or standard helix type. Hi-helix is sometimes characterized as a 120° rotor, while a standard helix is sometimes characterized as a 60° rotor. Each degree indicates the amount of rotor twist over the length. Other degrees of twist can be used based on the design, from zero degrees (parallel lobes) up to 170°, with an exemplary twist range of 60-150 degrees.

Figure 10:
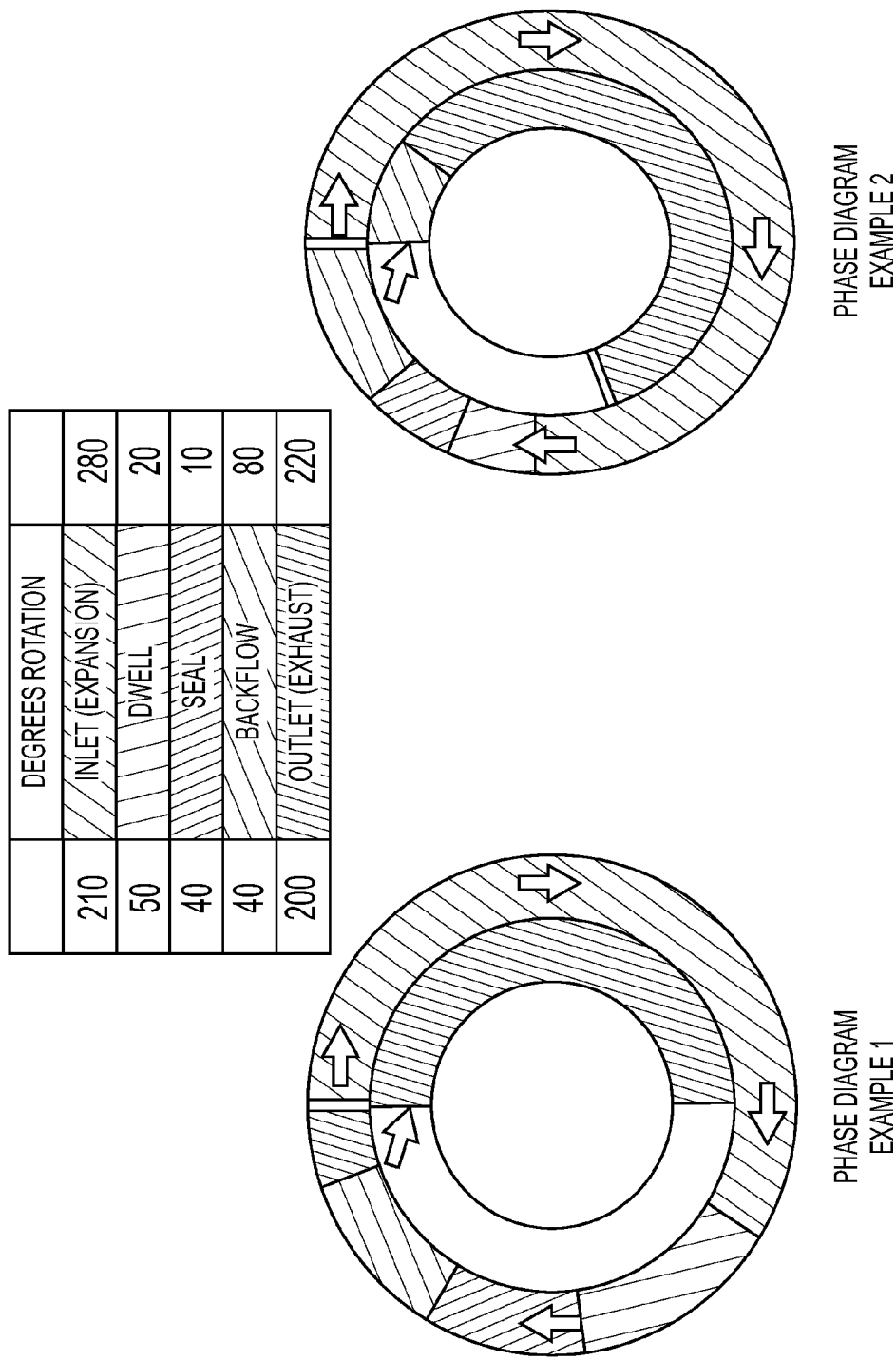
FIG. 10 is a comparison of phase diagrams for lobe timing.

For example, FIG. 10 compares a first example and a second example of phase diagrams and port timings for two exemplary superchargers. In example 1 on the left, the supercharger has two three-lobe rotors of the fifth generation, GEN V, style manufactured by Eaton Corporation. The lobes are twisted 60 degrees along their length. The phase diagram for example 1 indicates the rotational travel for each lobe of the rotor. A given lobe travels 210 degrees of rotation to complete the inlet phase, where air is drawn in through the inlet 1011 or 1012. The lobe then travel 50 degrees to complete the dwell phase and 40 degrees to complete the sealed phase. The backflow event is allotted 40 degrees of lobe travel, and the outlet, or exhaust, phase is allotted 200 degrees of lobe travel to blow the air out of the supercharger. By designing the backflow ports 122 and 1222 to be smaller than the allotted lobe travel, the transfer volume can experience an abrupt and lengthy backflow event. For example, the axial flow back flow slot 1222 can be designed to open in 10 to 15 degrees of rotor rotation, thereby yielding a lengthy cooled air backflow event.

Example 2 of FIG. 10 uses a supercharger with two four-lobe rotors. The lobes twist 160 degrees along their length. The inlet phase time is increased to 280 degrees, and the outlet phase time is increased to 220 degrees. The dwell phase is reduced to 20 degrees and the seal phase time is decreased to 10 degrees. The backflow event time is increased to 80 degrees. If the axial flow backflow port 1222 remains as above, made to open within 10 to 15 degrees of lobe rotation, the cooled air backflow event is further increased in duration. If a larger axial flow backflow port is used, such as a fully circular port, the port would not open as abruptly or remain fully open for the full backflow phase. In the case of the circular port, if it is sized to close completely via lobe blockage, it would take 30-40 degrees of lobe rotation to completely open the circular port.

Table 1 summarizes exemplary timing ranges available for twisted lobe Gen V (Fifth Generation) and TVS® (Twin Vortices Series) superchargers manufactured by Eaton Corporation. For a given lobe phase, the general timing range is given and is contrasted against six other timing scenarios for exemplary superchargers.

TABLE 1

| Lobe Phase | Timing Range (Degrees) | Example 1 Timing (Degrees) | Example 2 Timing (Degrees) | Example 3 Timing Ranges (Degrees) | Example 4 Timing Ranges (Degrees) | Example 5 Timing Ranges (Degrees) | Example 6 Timing Ranges (Degrees) |
|---|---|---|---|---|---|---|---|
| Inlet | 210-280 | 210 | 280 | 210-280 | 210-280 | 210-280 | 210-280 |
| Dwell | 20-50 | 50 | 20 | 20-50 | 0-50 | 20-50 | 20-50 |
| Seal | 10-70 | 40 | 10 | 20-40 | 15-70 | 10-50 | 15-45 |
| Backflow | 20-80 | 40 | 80 | 25-50 | 20-70 | 20-80 | 20-50 |
| Outlet | 200-220 | 200 | 220 | 200-220 | 200-220 | 200-220 | 200-220 |

For enabling abrupt opening and closing of the backflow port, it is advantageous to shape the port akin to the lobe shape. So, turning to FIG. 8, the upper axial flow back flow port 1222 is shown aligned with the lobe 102A. Because the port is "bean" shaped to substantially match the profile of the lobe, in this instance, match a segment of the outer curve of the lobe, the port does not suffer leakage of air in to the outlet volume 140E or in to the transfer volume 140S. Rather, the lobes are able to block cooled air transfer to seal against parasitic leakage of air. This is beneficial to prevent not only leakage of air back to the inlet volume 140I, but also to prevent outlet air from leaking backwards through the back flow ports. While it is permissible to leak cooled air to the outlet volume 140E, it is desired to limit squeeze of outlet air back through the back flow ports. It is possible with the "bean" shape to prevent leakage between the axial inlet backflow port 1222 and the outlet 104. It is possible with this design to limit cooled air backflow to the designated backflow volume 140B at the designated phase, as shown in FIG. 9. Thus, the axial flow back flow port 1222 is a slot designed to have a profile matching a segment on an involute curve. The slot can have rounded edges for smoothed air flow profile. The "bean shaped" slot can be described as a slot having four sides, each side being an arc of a circle. Alternatively, the axial flow back flow port 1222 is a rectangular slot, an oval hole, or a circular hole sized to open fully in 10 to 40 degrees of lobe rotation and sized to be fully obstructed by the lobe when the lobe is aligned over the hole. The radial flow back flow ports 122 are likewise designed to open and close abruptly, and this is accomplished via slots having rectangular, oblong, or other shapes matching the twist of the lobes along their axial lengths.

Rotors 102, 103 can be identical to each other. Or, lobes 102A, 102B, 102C of rotor 102 can be twisted clockwise while the lobes 103A, 103B, 103C of rotor 103 can be twisted counter-clockwise. For the examples of FIGS. 1, 5, and 8-10, because rotors 102, 103 have twisted lobes, the supercharger 100 can have much better air handling characteristics. Further, the supercharger 100 can produce less air pulsation and turbulence. The length of rotors 102, 103 can vary among applications. The size of the supercharger 100 can be determined by the length of rotors 102, 103. Rotors 102, 103 can be meshed together along the first axis, inlet axis IA, as the rotors rotate, and the rotors can be geared to rotate in opposite directions.

The air entering into the chamber 105 of supercharger 100 can be trapped in a gap between adjacent lobes of rotor 102, for example, between lobes 102A and 102B. The air can also be trapped in a gap between adjacent lobes of rotor 103, for example, between lobes 103A and 103B. The trapped air can be carried to an outlet 104 to be expelled out of the supercharger 100. In the examples shown, the supercharger is an axial-inlet, radial-outlet type supercharger. This means that the inlet air travels into the tubular housing along the axis of the rotors, parallel to the inlet axis IA. As the rotors rotate, the air moves radially away from the inlet axis IA and towards the outlet 104, which is in an outlet plane OP perpendicular to the outlet axis OA. The inlet axis IA and the outlet axis OA are perpendicular. The outlet 104 can be a triangular shape to match the shape of the rotors 102, 103, or another shape that allows for an easy exit of air. Since the volume of transferred air can be greater than the displacement of engine 120, the air pressure within engine 120 can be increased. In other words, the Roots type supercharger 100 can produce boost pressure by stacking more and more air into the intake manifold.

An intercooler 110 can comprise an inlet port 113, an outlet port 111, and a recirculation conduit 112. Each rotor 102, 103 can have an affiliated recirculation conduit 112 so that cooled air is fed back to the supercharger in a balanced manner. The inlet port 113 can be connected to the outlet 104 of the supercharger 100 to receive the discharged air. The intercooler 110 can be any mechanical device that acts as a heat sink. Further, the intercooler 110 can comprise a bar, a plate core, and fins (not shown in figures). Once the discharged air from the supercharger 100 enters the intercooler 110, air can move through bar and plate core to make its way to the outlet port 111, while becoming cooled through heat transfer. General details of the working mechanics of an intercooler are well known, and thus, will not be described herein. The intercooler 110 can vary dramatically in size, shape and design depending on the performance and space requirements of the supercharger system. Intercooler 110 can be air-to-air type or air-to-water type.

The outlet port 111 expels the cooled air towards an intake manifold of engine 121 and the outlet port 111 can be connected to conduits 112 by way of optional valves 114A and valve sensor and actuation devices 114. The conduits 112 can branch out either to left, right, or both sides of the outlet port 111. The other end of the conduit 112 connects to radial flow backflow ports 122 of supercharger 100 such that cooled air can be transferred between lobes of the rotors. Alternative examples enable conduit connectivity to the axial flow backflow ports 1222 alone or in combination with the radial flow back flow ports 122.

Some supercharger systems utilize back flow ports to reduce noise coming from the supercharger. Instead of receiving hot outlet air back flow, it is possible to use the radial flow back flow ports 122 for receiving cooled air from conduits 112. This can reduce the noise stemming from the operation of the supercharger. Therefore, having conduits 112 can improve noise, vibration, and harshness (NVH) capabilities of the supercharger.

Figure 5:
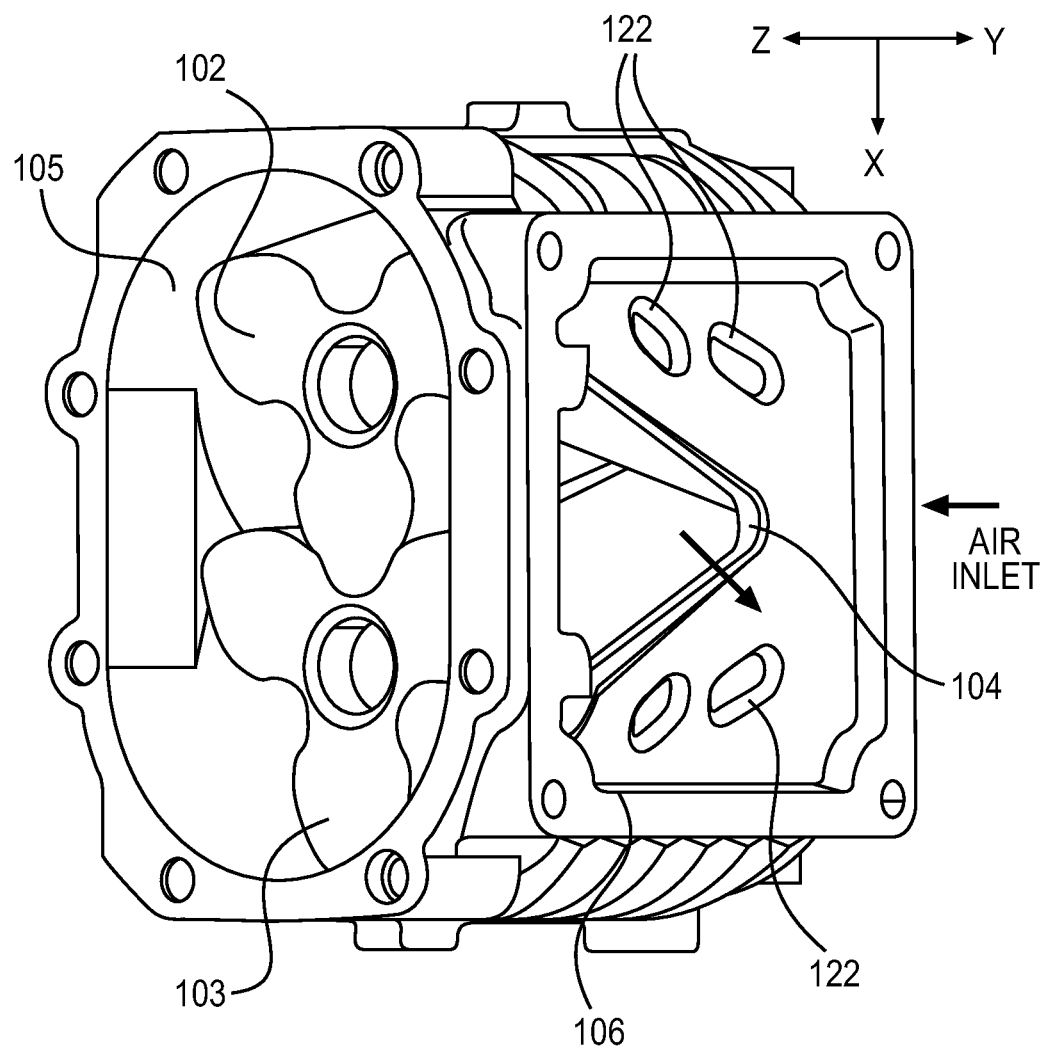
FIG. 5 is an example of a Roots type supercharger.

It may be necessary to adjust the size, shape, and location of the radial flow and axial flow backflow ports 122, 1222 shown in the Figures to provide optimal cold air input to the supercharger. The cold air radial flow backflow ports 122 of FIG. 5 are located on the main case 106 after the inlet 101 and before the outlet 104. That is, the radial flow backflow ports 122 are distinct from the inlet 101 and the outlet 104. The radial flow backflow ports 122 can align with the gaps between the lobes of the rotors such that as the rotors spin, the cooled air is mixed with intake air in a gap as the gap passes the radial flow backflow port 122. To ensure proper mixing, a distance between the inlet and a radial flow backflow port is greater than a distance between a gap and its adjacent backflow port. As shown in FIG. 5, the radial flow backflow port can be closer to the outlet than to the inlet.

The radial flow and axial flow back flow ports 122, 1222 are sized and shaped to introduce the cooled backflow air between the rotors at a location where the rotors form a "sealed volume." That is, the rotors rotate to move air from the inlet to the outlet of the supercharger, and there is a point where the gap between lobes is sealed from both the inlet and the outlet. Cooled backflow air is introduced in to this gap, or sealed volume, by the strategic placement, shape and number of radial flow and axial flow backflow ports 122, 1222.

For example, two radial flow back flow ports 122 may be used, as illustrated in FIG. 5, or one may be used, as illustrated in FIGS. 6A-9. The radial flow back flow ports 122 can be rectilinear or rounded, as illustrated, or another tunable shape, such as oval or circular. Preferably, the shape of the ports allows a sharp opening and closing of the ports, such that the backflow event occurs abruptly at a very high rate. The number of axial and radial flow back flow ports is selectable to augment the tuning of the cooled air backflow.

Inlet side axial flow backflow ports 1222 encourage axial flow of the cooled, high pressure backflow air by being positioned on the inlet side and at a location that causes cooled air to be drawn from the lower pressure, lower temperature inlet side to the high pressure, high temperature outlet side of the supercharger. The trajectory of the backflow air at the inlet side axial flow backflow ports 1222 is along the inlet axis IA, and so the high pressure cooled air rushes along the rotor length, as shown by the bold arrow in FIG. 9. Thus, the inlet side axial flow backflow ports 1222 complement the axial-inlet, radial-outlet design of the supercharger.

The cooled air backflow can be performed with only the inlet-side axial flow backflow ports 1222, with only the outlet-side radial flow backflow ports 122, or with a combination of inlet-side axial flow backflow ports 1222 and outlet-side radial flow backflow ports 122. Thus, the number of backflow ports can vary from two, one for each rotor, to six, yielding three ports for each rotor. If the ports are made smaller, a greater number of ports per rotor can be implemented.

Figure 6B:
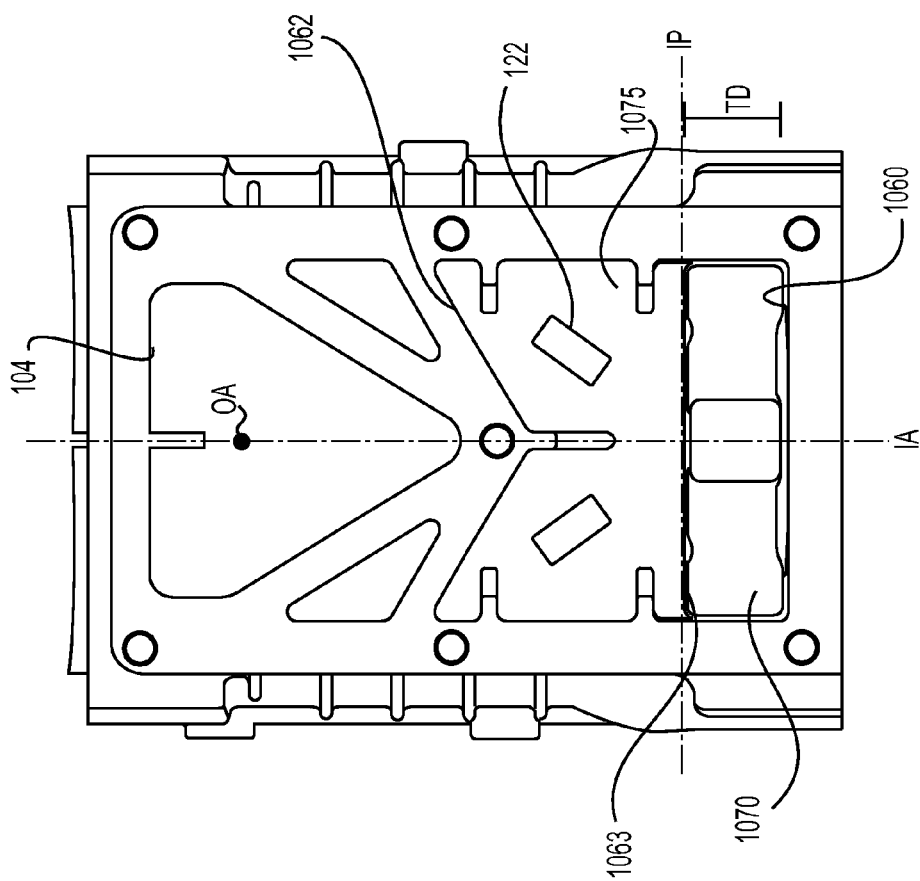
Figure 6A:
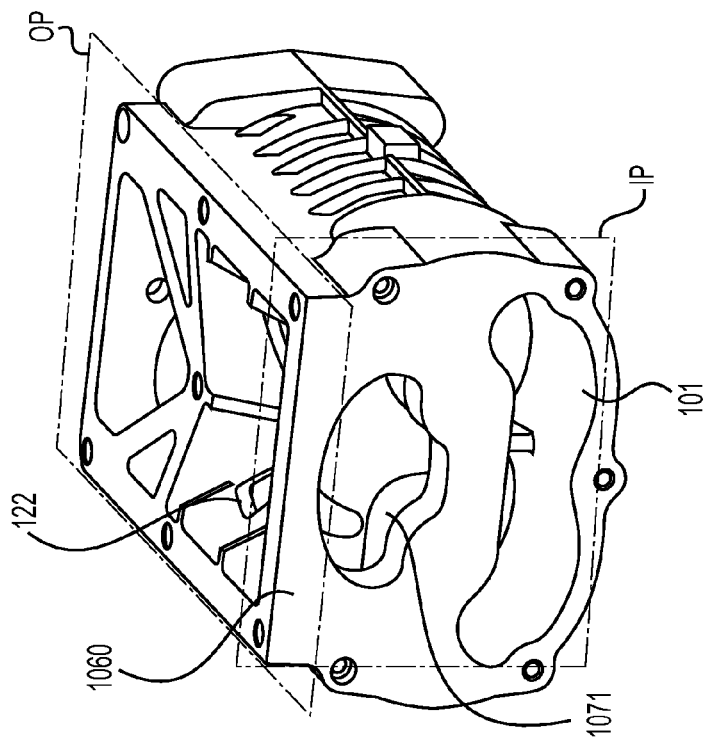

As shown in FIGS. 6A-7, the radial flow backflow ports 122 can be reduced from four to two on the outlet 104 side of the main case 106. Axial flow backflow ports 1222 are added to an inlet wall 1063 on the inlet 104 side of the main case. Inside the main case 106, an inner side of the inlet wall 1063 includes rotor mounting recesses 1020 and 1030 that intersect a plane parallel to the inlet plane IP. In another alternative, the main case comprises the axial flow backflow ports 1222 and does not include any radial flow backflow ports 122.

The tubular main case 106 includes a front plate 1060. In FIG. 6A, the front plate 1060 includes a machining pass-through 1061 to permit tooling access to the axial flow backflow ports 1222. The pass-through 1061 receives a plug to seal the front plate 1060 after machining. Alternatively, a recirculation conduit 112 is coupled to the pass-through 1061 to encourage axial backflow air flow with reduced reflection of air waves. To facilitate conduit coupling, the pass-through can be other shapes than the illustrated "mushroom" shape, such as circular, oval, rectangular, or square. FIG. 7 eliminates the pass-through 1061 in favor of a sealed front plate 1060.

A tuning distance TD between the inlet wall 1063 and front plate 1060 is selected to permit backflow air to couple to the axial flow backflow port 1222 without creating excessive standing waves or reflections of air back out of the chamber 105. The tuning distance TD is selected to limit flow losses and to control air restriction in to the axial flow backflow ports 1222. Additional control of the flow is determined by the length and diameter of the recirculation conduit 112 between the intercooler and the backflow compartment 1075. The backflow compartment 1075 can include the volume of air exposed to the radial flow backflow ports 122 and the volume of air exposed to the axial flow backflow ports 1222. The at least one divider 1062 cooperates with walls 1064, 1065 of the tubular housing and with the front plate 1060 to form backflow compartment 1075.

Inlet 101 optionally includes a support 1010. Inlet 101, as above, supplies intake or bypass air to the rotors 102, 103 of the supercharger. The support 1010 provides an indicator in FIG. 6C for the halves of the inlet. Inlet area 1011 is allocated for rotor 103, and inlet area 1012 is for rotor 102. The inlet 101 can be described as extending for an amount of the tubular housing. But, it is convenient to define the inlet for each rotor such that inlet area 1012 has an inlet extent $\theta_I$ in a circular area of the inlet wall 1063 allocated for rotor 102. Using this convenient reference, the inlet face is divided in to 360 degrees about a center point at vertex V in the rotor mounting recess 1020. The transfer or seal extent $\theta_S$ occupies another portion of the inlet wall 1063. The axial flow back flow port 1222 occupies a backflow extent $\theta_B$, and the remainder of the circular area is for rotor travel to accommodate the outlet phase and rotor meshing. A mirror image of the angular extents is applicable to the rotor mounting recess 1030 utilizing a vertex V2 and inlet 1012.

The use of the vertices V, V2 divides the inlet plane to explain the locations for the axial flow back flow ports 1222 with respect to the inlet 104. Depending upon whether the rotors comprise 3, 4, or 5 lobes, and depending upon the twist of the lobes being 60-150 degrees, the inlet area 1011 occupies an extent $\theta_I$ in the inlet plane. So while the timing requires a large rotation angle for the twisted lobe to pass the inlet area 1011, the angular extent of the inlet area $\theta_I$ can be smaller than the degree of the timing. Inlet extent $\theta_I$ can be approximated by adding the rotor twist angle to the dwell phase of Table 1, for a range of 80-200 degrees.

Seal extent $\theta_S$ can be approximated by adding the seal phase of Table 1 to the lobe spacing. Depending upon whether the lobes are spaced 72, 90, or 120 degrees apart, or another spacing, and using a seal phase of 10-70 degrees, the seal $\theta_S$ would be in a range from 82-190. As above, the axial flow back flow port 1222 opens or closes in 10-40 degrees of lobe rotation, and so the backflow extent $\theta_B$ is approximated to occupy 10-40 degrees of the inlet plane about the vertex V. The inlet area 1011 is thus separated from the axial flow back flow port 1222 by approximately 82-190 degrees. Table 2 offers additional examples for explaining the location of the axial flow back flow ports 1222.

TABLE 2

| | Angle Range of Inlet Plane Occupation | Angle of Inlet Plane Occupied Example 1 | Angle of Inlet Plane Occupied Example 2 | Angle of Inlet Plane Occupied Example 3 | Angle of Inlet Plane Occupied Example 4 |
|---|---|---|---|---|---|
| $\Theta_I$ | 80-200 | 80 | 170 | 110 | 200 |
| $\Theta_S$ | 82-190 | 100 | 170 | 140 | 170 |
| $\Theta_B$ | 10-40 | 10-40 | 10-40 | 10-40 | 10-40 |

Inlet 101 is sealed from the backflow volume in integrated manifold 1070 via a floor 1071. The floor can be an inserted seal or part of the housing casting. The support 1010 couples to floor 1071 of integrated manifold 1070. The floor 1071 is between the inlet wall 1063 and the front plate 1060 and forms the integrated manifold 1070 in cooperation with extensions of walls 1064 and 1065. Floor 1071 fluidly separates the inlet 101 from the axial flow back flow ports 1222 by providing physical separation between inlet 101 and integrated manifold 1070. Inlet air thus cannot mix with cooled backflow air.

The inlet 101 extends through the front plate 1060 and intersects an inlet plane IP along inlet wall 1063. The axial flow backflow ports 1222 are also in the inlet plane IP. The inlet plane IP is perpendicular to the inlet axis IA, which is shown coming out of the page in FIG. 6C.

The outlet 104 and, when used, the radial flow back flow ports 122, are in an outlet plane OP that is perpendicular to the inlet plane IP. The outlet plane is also parallel to the inlet axis IA. An outlet axis is shown coming out of the page in FIG. 6B. The outlet axis is perpendicular to the inlet axis IA and is perpendicular to the outlet plane OP, as in FIG. 6A. When describing the supercharger as an axial inlet, radial outlet device, it is convenient to explain that air travels in to the supercharger inlet 101 and through the axial flow backflow ports 1222 axially, or along the rotor axis, which are parallel to inlet axis IA. As the supercharger acts on the inlet air and the backflow air, the air is directed to leave the outlet 104 radially with respect to the rotor axis, meaning the air exhausts along, or generally parallel to, the outlet axis OA. This differentiates the supercharger from radial inlet, radial outlet devices, which do not have the same air flow characteristics or leakage constraints.

A tuning distance TD separates the front plate 1060 from an inlet wall 1063 of the main case 106. The tuning distance TD is selected to regulate the flow of cooled backflow air to the axial flow backflow ports 1222. The alignment of the integrated manifold 1070 with the axial flow backflow ports 1222 is selected to direct the air flow in to the chamber 105 in the direction of the outlet 104. By directing the flow, the supercharger works less, compared to the radial flow backflow ports 122, to blow the air out because the air flows axially along the rotor as the rotor spins in the chamber 105.

Figure 8:
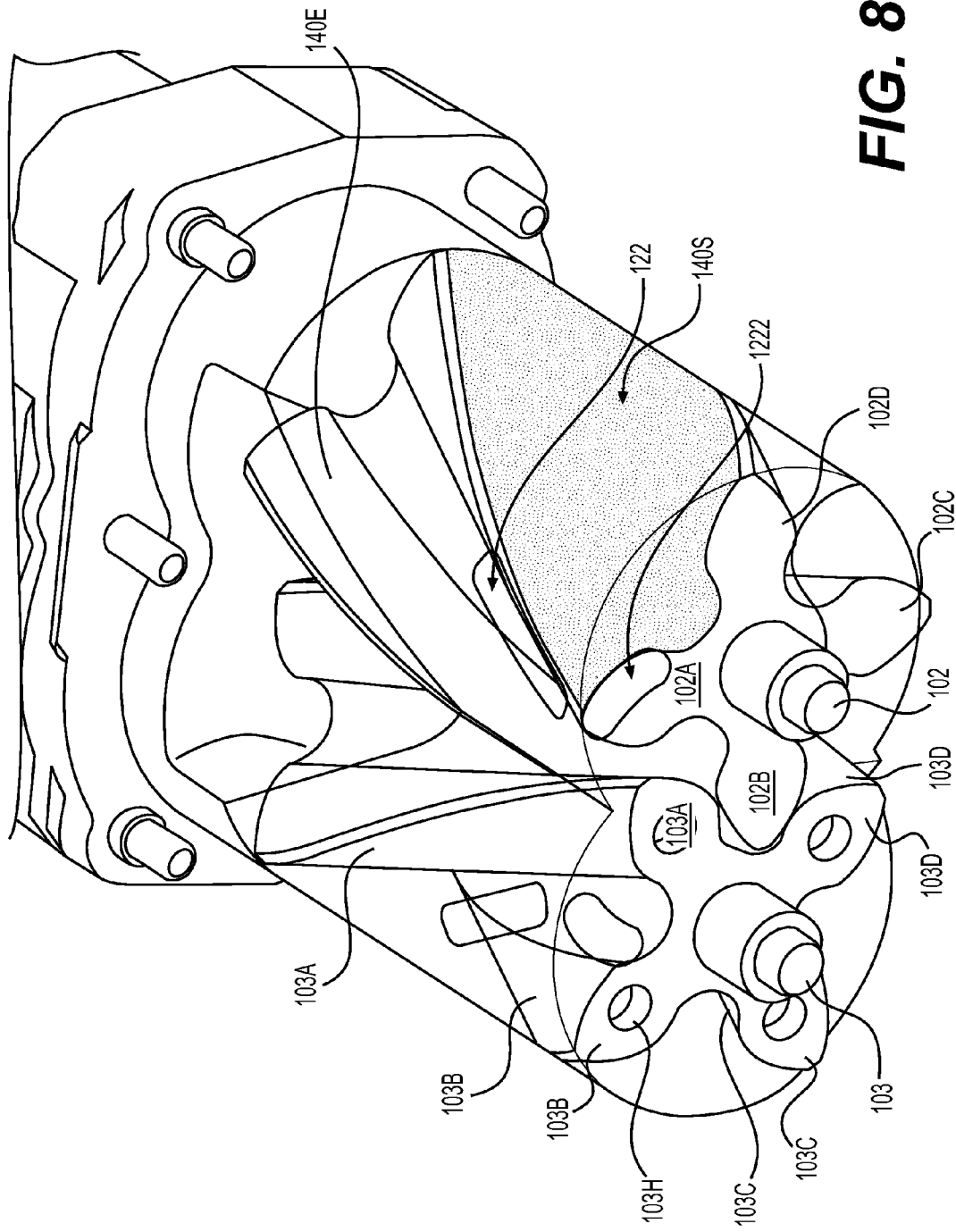
FIG. 8 is a view of air transfer between lobes.
Figure 9:
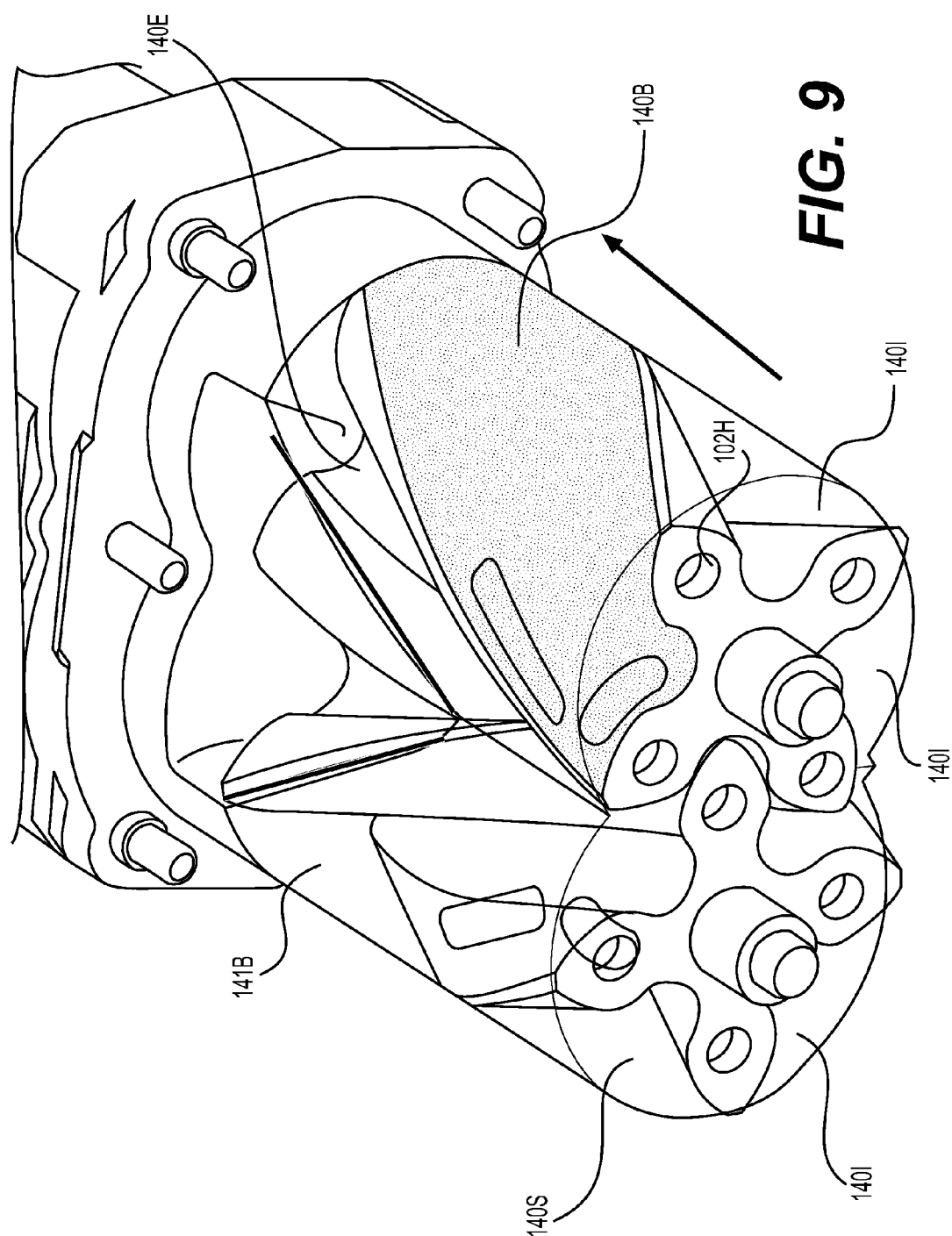
FIG. 9 is an alternative view of air transfer between lobes.

Referring to FIGS. 8 and 9, the cooled backflow air exits the intercooler 110 and is directed to the backflow compartment 1075. The lobes 102A-102D and 103A-103D are twisted along the length of their respective rotors and are hollow, as indicated by the hollows 102H and 103H. Looking to FIG. 8, lobe 102B and 102C are exposed to the inlet 101 and permit an inlet volume 140I of air to enter the main case 105. Lobe 102D is sealed against the main case 105. Lobe 102A also seals against the main case 106 and blocks its affiliated axial flow backflow port 1222 and blocks its affiliated radial flow backflow port 122. A sealed transfer volume 140S is formed between lobes 102A and 102D. An exit volume 140E of air is exposed to the outlet 104 between lobes 102A and 102B.

When the rotor 102 rotates additionally, as shown in FIG. 9, lobe 102A no longer blocks axial flow backflow port 1222 and no longer blocks radial flow backflow port 122. Cooled backflow air can now enter the gap between lobes 102A and 102D. Ideally, though not required, the transfer volume is still sealed from the inlet and from the outlet, but the sealed transfer volume 140S of air mixes with the cooled backflow air to form a backflow transfer volume 140B. As the inlet air moves from the inlet to outlet, the inlet air is heated. The cooled backflow air follows thermodynamic principles, moving from low temperature to high temperature and from high pressure to low pressure, thereby progressing from the inlet end of the rotor 102 to the outlet 104. The result is a greater amount of air blown by the supercharger between lobes 102A and 102D.

The rotors 102, 103 of FIGS. 8 and 9 are meshed and oppositely rotating, and the timing of the rotors is such that rotor 103 is exposed to cooled backflow air input at different times than rotor 102. So, when rotor 102 blocks axial flow backflow port 1222, rotor 103 exposes the gap between lobes 103A and 103B to cooled backflow air to create a backflow transfer volume 141B. Rotor 103 blocks its axial flow backflow port 1222 when rotor 102 has fully exposed its axial flow backflow port 1222. The extent of blockage or exposure is determined by the shape and size of the lobes 102A-102D, 103A-103D and by the shape, location, and size of the axial flow and radial flow backflow ports 122 and 1222.

As illustrated in FIG. 8, the shape and orientation of the lobes 102A-102D, 103A-103D and the shape and orientation of the axial flow and radial flow backflow ports 122 and 1222 complement one another. The complementary pairing permits the tuning of sealing and timing. Thus the sealed transfer volumes open to the backflow transfer volumes at distinct points as the lobes pass the backflow ports. As above, the use or non-use of the axial flow or radial flow backflow ports with one another permits additional tuning of the backflow characteristics and thus the compression ratio of the supercharger.

Thus, for customer compression ratio demands, a system can be designed to operate a supercharger at an ideal rotor speed to achieve an ideal compression ratio, and the size, orientation, and timing of the lobes are selected to complement the use of one or both axial flow and radial flow backflow ports to further tailor the achievement of the target compression ratio. Greater control of standing waves inside the chamber 105 is achieved. Greater control over exit pulsations is achieved.

As an additional point of air flow tailoring, the length and diameter of the input 101 is selected to impact the length of standing waves in the chamber 105. Thus, not only the tuning distance TD of the integrated manifold 1075 is controllable, but the input 101 length is also controllable.

At least one divider 1062 separates the outlet 104 from the backflow compartment 1075. The outlet 104 and divider 1062 can mate with ducting for communicating air with an intercooling device. And the divider 1062 and backflow compartment 1075 can mate with the recirculation conduit 112.

The width of the intercooler outlet port 111 can be designed to meet the need of a particular supercharger in consideration of size, type, and space, along with other performance requirements. For example, the width of outlet port 111 can be much wider than the width of the radial flow backflow port 122. As an example, the width of the outlet port 111 can be 43 mm while using the width of a single backflow conduit 112 of 8 mm. In other designs, the radial flow and or axial flow backflow port and affiliated conduit can have a greater cross-sectional area than the outlet port 111 and its affiliated conduit. The port and conduit sizes are adjusted for particular applications to ensure fluid flow from supercharger outlet, to intercooler, to backflow port. Thus, thermodynamic laws for pressure and temperature impact backflow port locations and sizes so that cooled air exiting the intercooler 110 can backflow via the conduit 112 back to the supercharger 100.

As one example, the size of the radial flow and axial flow backflow ports 122, 1222 is determined by the below estimation of the port area $A_{Port}$:

$$A_{Port} = \frac{\left(\frac{P_2}{RT_2} V_{TransferVolume} - \frac{P_1}{RT_1} V_{TransferVolume}\right)}{\left(\frac{\text{Angle for Backflow} \times 60}{360} \Big/ N_{RPM}\right)} \Big/ \frac{P_2}{RT_2} \frac{a_1}{\gamma}\left(\frac{P_2}{P_1} - 1\right)\left(\frac{\frac{2\gamma}{\gamma+1}}{\frac{P_2}{P_1} + \frac{\gamma-1}{\gamma+1}}\right)^{1/2}$$

where $P_1$ is the inlet pressure, $P_2$ is the maximum pressure ratio of the outlet, $T_1$ is inlet temperature, $T_2$ is outlet temperature, R is a gas coefficient, $N_{RPM}$ is the maximum speed in rotations per minute ("RPM") of the supercharger, $V_{TransferVolume}$ is the volume of air transferred, $\alpha$ is the speed of sound at the given inlet temperature $T_1$, $\gamma$ is a ratio of specific heat at a constant pressure and constant volume.

Port area $A_{Port}$ determines what total area should be allocated for the cooled backflow air transfer. Thus, the sum of areas allocated to the axial flow backflow ports 1222 and or radial flow backflow ports 122 should total the port area $A_{Port}$. The ideal port area $A_{IPort}$ is in the range of one fourth (¼) to 4 times $A_{Port}$. More specifically, the ideal port area $A_{IPort}$ is one half (½) to 2 times $A_{Port}$. More specifically, the ideal port area $A_{IPort}$ is two thirds (⅔) $A_{Port}$.

Because the axial flow back flow ports 1222 encourage axial air flow towards the outlet 104, it is advantageous to allocate all, or most, of the port area $A_{Port}$ to these backflow ports. Thus, in consideration of the timing constraints, the axial flow back flow ports 1222 should comprise as much port area $A_{Port}$ as feasible, even in favor of omitting the radial flow back flow ports 122. But, if additional area is needed to meet the port area $A_{Port}$ while meeting the above 10-15 degree to 30-40 degree lobe rotation for opening the axial flow back flow ports 1222, then that additional area should be allocated to the radial flow back flow ports 122. When an especially large port area is required, it can be necessary to include multiple radial flow back flow ports 122, as illustrated in FIG. 5. When the inlet area is physically constrained in an installation, it can be necessary to omit the axial flow backflow ports 1222 in favor of utilizing only radial flow backflow ports 122. Thus, there can be one or more sets of backflow ports to meet design constraints. The one or more backflow ports are distributed to effectuate cooling of the backflow volume 140B while preventing leakage of air back to the inlet, minimizing squeeze from the outlet 104, and permitting abrupt opening and closing of the backflow ports.

By way of example, for a supercharger having only axial flow backflow ports 1222 and no radial flow backflow ports 122, cooled backflow air enters the sealed transfer volume 140S to form backflow transfer volume 140B. The integrated manifold 1075 seals the low pressure inlet air from the higher pressure cooled backflow air volume. The cooled backflow air enters the axial flow backflow ports 1222 parallel to the rotors and in the direction of the air discharge at outlet 104. The lobes of rotors 102 and 103 are configured as in FIGS. 8 and 9 to prevent a "short circuit" between the inlet volumes 140I, 141I and backflow transfer volumes 140B, 141B. That is, the cooled backflow air cannot communicate with the inlet 104 because the lobes are sealed to prevent the backflow air from reaching the inlet 104. As illustrated, it is desired to have a sealed transfer volume 140S, 141S that does not communicate with the inlet 104 or outlet 105 prior to the backflow of cooled air. While it is possible to permit some connection between the backflow transfer volume 140B and the outlet volumes 104E, 141E, in this example, the inlet, backflow, and outlet air volumes are independent of one another. A seal time of 15-45 degrees, a backflow angle of 20-50 degrees, and a rotor twist of 60-130 degrees is applied.

In addition to adjusting the width of the radial flow and axial flow backflow ports 122, 1222, it is possible to adjust the length of the backflow conduit 112 to tune the flow back in to the supercharger. The location of the radial flow and or axial flow backflow port is selected to inject cooled air in to the supercharger to cool the air mass. The ideal location to inject the air is in to a sealed volume between rotating lobes of the rotor. That is, the rotors are in a location that seals the injected air mass from the inlet and from the outlet. To tailor the cooling effect, the amount of air moved back to the supercharger lobes must be controlled. Air injected between lobes of the supercharger is tailored by selecting the length and width of the backflow ports, thus tuning the flow. Additional tailoring is achieved by controlling the volume of the flow, as by valves, discussed below.

By backflowing the cooled air and mixing the same with the air input to the supercharger 100, the air will be more tightly stacked in the intake manifold 121. The pressure ratio will be higher than stacking the air not mixed with the cooled air. In other words, by using cold high pressure air from the outlet 111 of the intercooler, the temperature inside the supercharger 100 can be reduced. Thus, a higher pressure ratio can be achieved. Therefore, without increasing the size of the supercharger 100, greater boost is provided to engine 120.

In addition, since the cooled air is mixed with the air in the supercharger, the resulting air transported out of the supercharger can be even cooler, thus increasing the combustion efficiency. At the same time, a low temperature can allow supercharger 100 to go to a higher pressure ratio before reaching the thermal limit of the supercharger. Furthermore, since the air coming into the supercharger 100 is mixed with the colder air backflowing through conduits 112, the supercharger 100 would be able to intake hotter air than the conventional supercharger. In other words, the modified supercharger system can improve the supercharger's capability to handle high temperature inlet air.

For example, tolerances can be strategically reduced because the cooled backflow air prevents the supercharger from attaining a high heat from the blowing of intake air. Or, a higher intake air temperature can be accommodated with customary tolerances because the cooled air will bring the overall air temperature within normal operating ranges. Since the relationship between thermal expansion tolerances and outlet temperatures is linear, if the outlet temperature is reduced, the tolerances between the rotors can be reduced, and the tolerances between the rotors and housing can be reduced by the same percentage that the outlet temperature is reduced.

There can be other benefits of using the recirculation conduits 112 in the supercharger system 10. In the modified system, EGR (exhaust gas recirculation) handling capability can be improved since the air recirculated via EGR can be cooled with the backflow air.

Conduits 112 can also improve efficiency of the supercharger 100. Having conduits 112 can lower the outlet 104 temperature and in turn lower the overall temperature operation range of the supercharger 100. If the overall temperature operation range is reduced, then tolerances between rotors and the case can be tightened, and thus improve operating efficiency of the supercharger 100.

The placement of radial flow and axial flow backflow ports 122, 1222 can be distanced from the inlet 101 and the outlet 104, and rather close to rotors 102, 103. The size and shape of the radial flow and axial flow backflow ports 122, 1222 is designed to optimize cooled air flow from the intercooler to in between rotor lobes while minimizing the use of the ports as an air outlet. By selecting the dimensions (length, width, height) of the conduits 112, and by virtue of high pressure air moving towards areas of low pressure, the cooled air moves back towards the hot chamber 105.

Figure 1B:
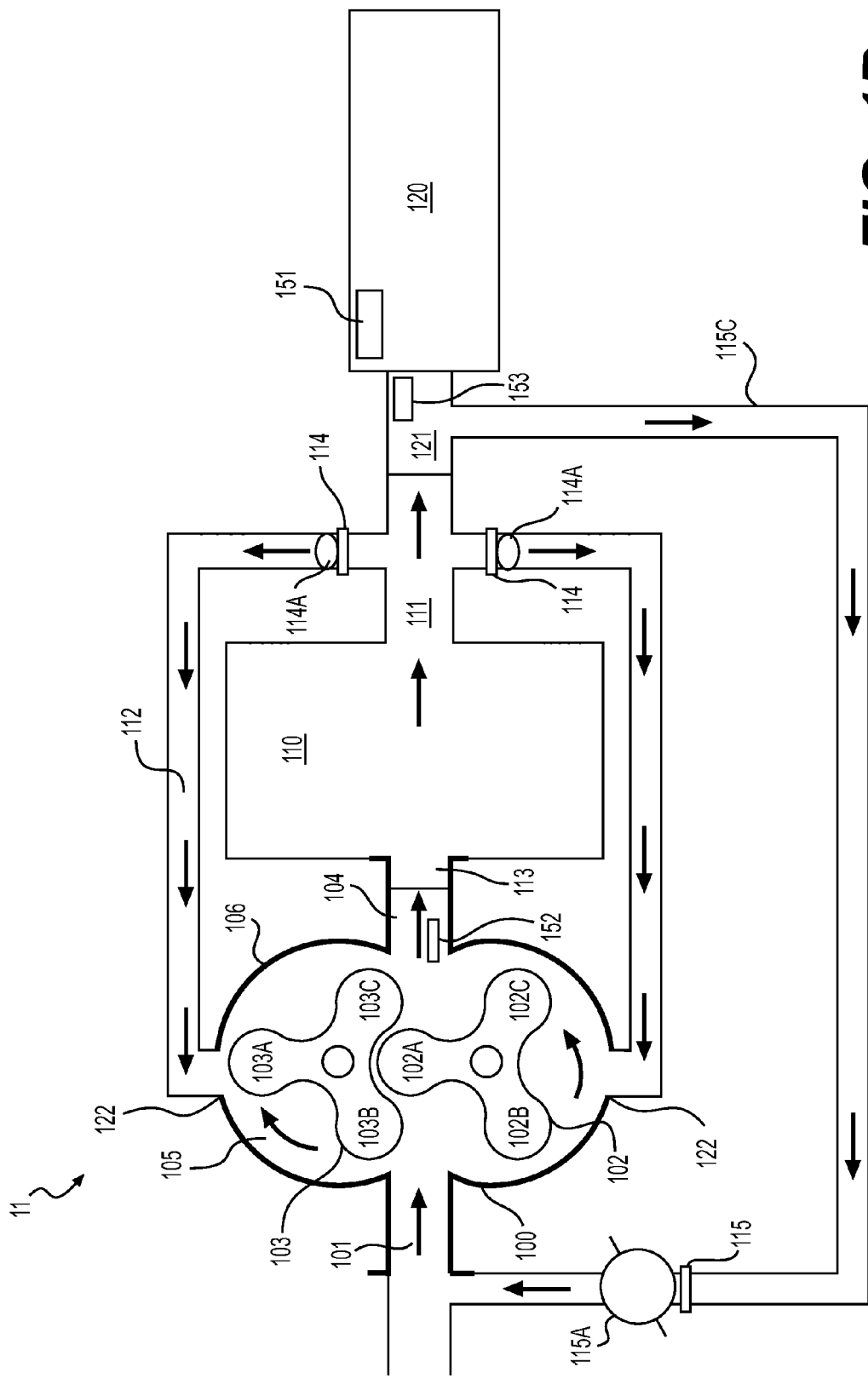
FIG. 1B is a schematic of a supercharger system with cooled air backflow conduits and having an air bypass conduit.

FIG. 1B is a schematic of a supercharger system 11 with cooled air backflow conduits 112 and having an air bypass conduit 115C. The system 11 allows air bypass at times when the supercharger's full capacity is not needed in the combustion engine. So, in periods where limited or no engine boost is desired, air can be bypassed away from the engine 120 and returned to the inlet 101 of the supercharger 100. Bypass conduit 115C is shown after the intercooler 110, though other locations are possible. A bypass valve 115A is controlled via bypass actuator 115. The bypass actuator 115 can comprise a sensor in addition to actuation mechanisms and control electronics to receive commands and emit signals for controlling bypass valve open or close parameters.

Figure 1C:
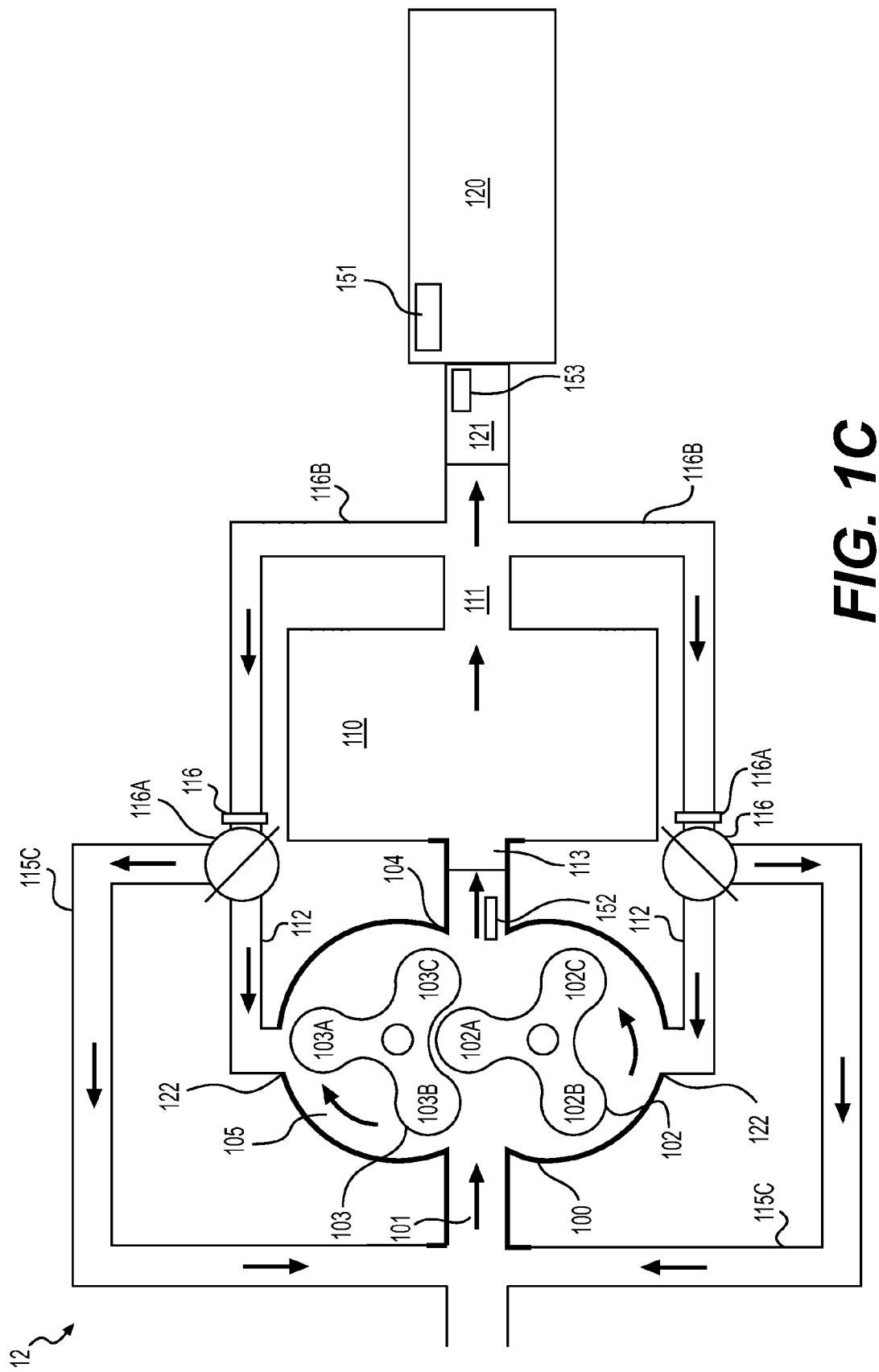
FIG. 1C is a schematic of a supercharger system with combined air backflow and air bypass conduits.

FIG. 1C is a schematic of a supercharger system 12 with combined air backflow and bypass conduits. A multi-way valve 116A receives cooled air from intercooler outlet 111 via the combined conduit 116B. Actuator 116 can comprise a sensor in addition to actuation mechanisms and control electronics to receive commands and emit signals for controlling multi-way valve 116A open or close parameters. Multi-way valve 116A can be controlled to bypass air in bypass conduit 115C to the inlet 101 of supercharger 100. Multi-way valve 116A can also direct cooled air to radial flow backflow ports 122 via conduit 112. While a single valve is illustrated for multi-way valve 116A, alternatives use more than one valve or additional conduit branching to achieve the bypass and backflow principles.

FIGS. 1B and 1C offer control of the backflow event and enable adjustment to the temperature and flow rate at the outlet 104 of the supercharger 100. That is, the bypass valve 115A or multi-way valve 116A can be controlled to adjust an intake flow rate by adjusting air supplied to inlet 101. The backflow event can be adjusted by control of valve 114A or multi-way valve 116A. While only radial flow backflow ports 122 are illustrated in FIGS. 1A-1C, as above, there can be only axial flow backflow ports 1222, multiple radial flow back flow ports 122, or a combination of axial flow and radial flow back flow ports.

FIG. 2A shows a control mechanism 20 for the backflow control system of FIG. 1A. The control mechanism 20 can be programmed to control the backflow event to adjust the temperature at the outlet 104 of the supercharger 100. The control mechanism 20 enables the implementation of a method for controlling the outlet condition of the supercharger 100 through conditioning of the backflow air.

The control mechanism 20 can control air circulation through the system 10, allowing some portion of cooled air to backflow to the supercharger 100. At times, it may be beneficial to terminate backflow, so the control mechanism 20 can adjust the amount of cooled air from zero up to a maximum amount by controlling actuators 114 affiliated with valves 114A. The maximum amount of backflow is calculated and controlled based on engine air flow demands and temperature requirements, and thus can vary based on operating conditions and from vehicle to vehicle and from driver to driver.

The control mechanism 20 can control whether a backflow or bypass event takes place. When the supercharger actively blows air to the engine, the control mechanism 20 controls the valves 114A and 116A to provide a backflow event. But when cooling is not needed, or when the supercharger is idling, the control mechanism controls bypass valve 115A and valves 114A or valve 116A to bypass air back to the inlet side of the supercharger. If the air is cooled by the intercooler 110, then the bypassed air can cool the supercharger and the passive (not-blown) air passing through the system. Because this passive cooling is not always needed, it is possible to connect the bypass valve 115A prior to the intercooler 110 to bypass uncooled air back in to the system.

Control mechanism 20 can be a part of one or more control mechanisms employed in a vehicle, such as on-board computers, computing chips, and other processing devices that control vehicle operations. Control mechanism 20 includes customary non-transient computing elements, such as transmit and receive ports, processor, memory, and programming.

The control mechanism 20 can be a part of an engine control unit (ECU). The control mechanism 20 can include a controller 150, sensors 151, 152, 153, and an actuator 114 that operates valve 114A. The actuator 114 can include sensors for collecting data on the opening degree of the valve 114A. The number and placement of sensors can vary based on feedback control implemented, and so the system can have more or less sensors and actuators than in the illustrated example. The sensors can be of a variety of types capable of sensing conditions and of sending signals, such as temperature, pressure, speed, or air flow (velocity). The illustrated sensors can include a plurality of types, such that a sensor can measure multiple conditions, such as both temperature and air flow.

The valve 114A can be opened or closed as determined by the controller 150 to be appropriate for the vehicle's operation mode. The opening degree of the valve 114A can range from fully open to fully closed.

The determination of opening/closing the valve 114A can be made by measuring the temperature of the air at the outlet 104, or the temperature in the engine 120. Further, the temperature reading of the air expelling out of the outlet port 111 can also affect the decision to open/close or to adjust the opening degree of the valve 114A.

The sensor 151 can be a mass air flow sensor (MAF), measuring the mass flow rate inside the engine 120. For instance, the sensor 151 can be a hot wire sensor. Sensor 151 can be positioned inside the engine 120. The reading from the sensor 151 ensures that optimal amount of air is being supplied to the engine 120. Sensor 151 can also measure the temperature inside the engine.

The sensor 152 can be a temperature sensor, measuring the temperature of the blown air exiting the outlet 104 of the supercharger 100. The sensor 152 can also measure the flow rate of the air. The air blown out from the supercharger 100 may need to be sufficiently cooled prior to entering the intake manifold 121. If the air is not sufficiently cooled, then the most power efficient combustion process may not occur in the engine 120. Therefore, the air temperature may need to be reduced by the intercooler 110 to reach the optimal temperature to enable more efficient and powerful combustion inside the engine 120. By backflowing cooled air to the supercharger 100, the air at the outlet 104 is lowered significantly. And, when the temperature of air must be increased for efficient engine operation, the valve 114A can be adjusted to restrict cooled air backflow.

The sensor 153 may be a pressure sensor, measuring the pressure of the air building in the intake manifold 121 of the engine 120. The purpose of the supercharger 100 is to provide a boost to the engine 120, allowing the engine 120 be more powerful. Boost is given in terms of pressure ratio, which is the ratio of absolute air pressure before the supercharger to the absolute air pressure after compression by the supercharger 100. Therefore, it is important to have the appropriate pressure for air entering the intake manifold 121. The pressure sensor 153 can be located on the intake manifold 121 of the engine 120 to provide feedback to controller 150.

The readings from the sensors 114, 151, 152 and 153 are transmitted to the controller 150. The controller 150 can compare each received reading from the sensors 114, 151, 152, and 153 with predetermined values. The predetermined values can be calculated optimal values that have been saved in the control system, or the predetermined values can be calculated in real time based on vehicle dynamics.

For example, the reading from the sensor 151 can be equal to a predetermined value. That means that the current air amount going into the engine and air entering into the supercharger is optimal. Therefore, if the controller 150 determines that the reading from the sensor 151 is equal to the predetermined value, then no action may be taken. On the other hand, the reading from the sensor 151 may not be equal to the predetermined value. That means that the current flow rate or temperature of air, either going into the engine or exiting the supercharger, is not optimal. In this case, the controller 150 can emit a signal to either open or close valves 114A using actuators 114, among other adjustment signals. By opening or closing valves 114A, the temperature of the supercharger can be adjusted. By controlling the he backflow event, outlet pressure pulsations can be influenced depending on the desired results. Additional control mechanisms can be implemented to adjust the speed of the supercharger 100, among other operating conditions. Similar determinations and adjustments can be made for the remaining sensors.

The controller 150 can adjust an amount of air in conduit 112 by controlling the opening degree of the valve 114A. Similarly, the controller 150 can adjust other operating conditions, such as an opening degree of a throttle valve. By having the appropriate amount of air either in backflow or entering the supercharger 100, the efficiency of the supercharger system 10 can be ensured.

Alternative control mechanisms 21 and 22 are shown in FIGS. 2B and 2C. Control mechanism 21 corresponds to system 11 of FIG. 1B. Similar to that outlined for FIG. 2A, the controller 150 of FIG. 2B can adjust the backflow event. The system 11 can also send signals to bypass actuator 115 to control the amount of air bypassed away from engine 120. This enables more control over the amount of air entering supercharger 100.

FIG. 2C likewise controls multi-way actuator 116 of multi-way valve 116A to tailor the amount of cooled air bypassed to the inlet 101 or provided to radial flow backflow ports 122 and/or axial flow backflow ports 1222.

Engine air flow demand can be based on a variety of other vehicle operating conditions, so, in addition to comparisons to predetermined values, or alternatively thereto, calculations can take place in real time. The simplified control mechanisms of FIGS. 2A, 2B, and 2C can thus be augmented to include additional sensors and feedback and can be tied to other vehicle controls, such as acceleration, yaw, rollover, slip, braking, etc. Thus, as engine air flow demands change due to these other factors, the cooled air backflow and bypass events can be adjusted to tailor air temperature at outlet 104.

Figure 3:
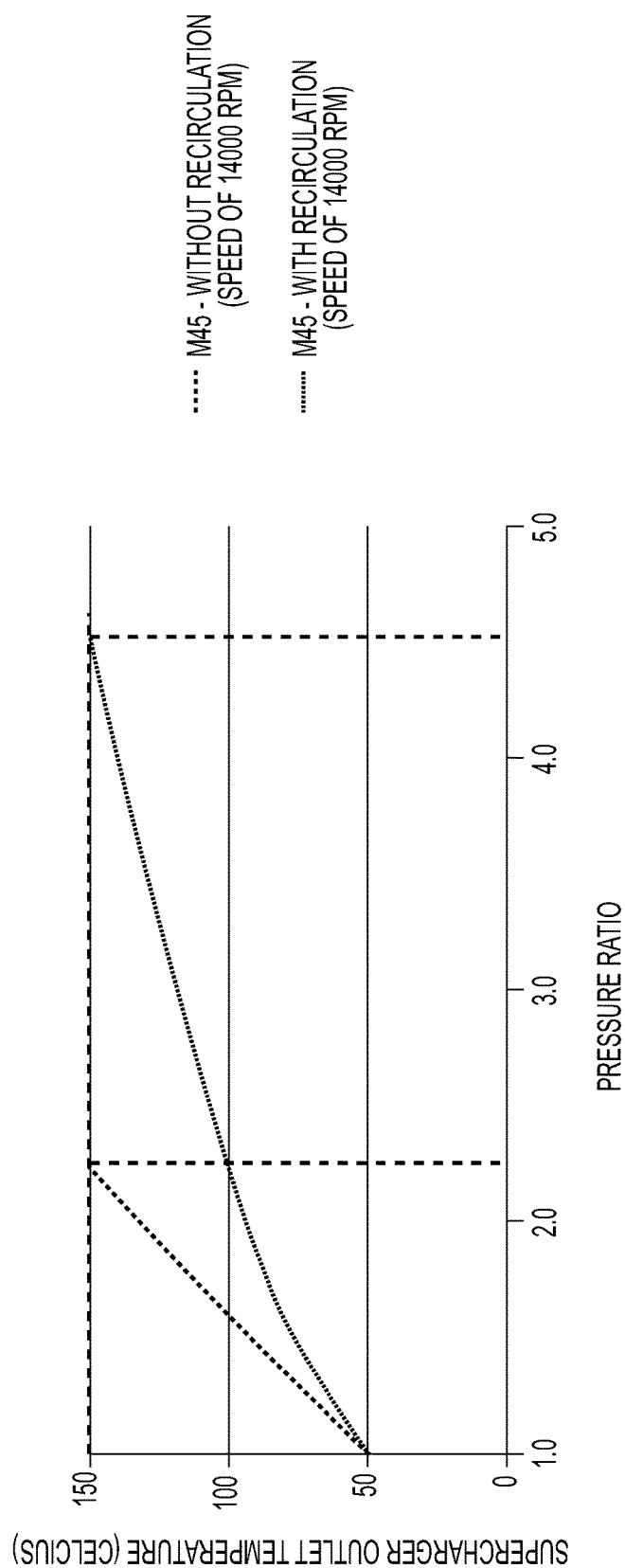
FIG. 3 is a graph showing pressure ratios.

Experiments were conducted to test the effect of the backflow of cooled air at 14,000 RPM. The results obtained in these experiments will be now explained using FIG. 3. The graph in FIG. 3 shows the relationship between the temperatures at supercharger outlet 104 with the pressure ratio achievable. FIG. 3 graphs experimental data conducted at a speed of 14,000 RPM. The vertical axis indicates the temperature of supercharger outlet 104 while the horizontal axis indicates pressure ratio. In doing the experiment, the thermal limit was set to 150° C. The thermal limit, or maximum operating temperature, is one of the parameters for determining the pressure ratio of a Roots type supercharger. If one increases the pressure supplied by the supercharger without increasing the temperature of the supplied air, then significantly higher pressure ratio can be reached. The inlet temperature was constant at 27° Celsius. The supercharger used in the experiment was an M45 Roots type supercharger manufactured by Eaton Corporation, like the example shown in FIG. 5.

The graphs show data for the pressure ratio for the M45 supercharger without cold air backflow, and the pressure ratio for the M45 supercharger with cold air backflow. The resulting graph line for the M45 supercharger without cold air backflow is inclined to about 45 degrees, more sharply than with cold air backflow.

The results indicate that a higher pressure ratio for the given thermal limit occurs in the M45 supercharger with cold air backflow. FIG. 3 shows that at 150° Celsius, the pressure ratio for the M45 without cold air backflow was 2.2. To achieve a pressure ratio higher than 2.2, the supercharger must be run beyond its thermal limit, which is not practical because of the thermal expansion of parts and interference with tolerances. However, by having the cold air backflow in the M45 supercharger, the pressure ratio increases to about 4.5 without exceeding the thermal limit.

Figure 4A:
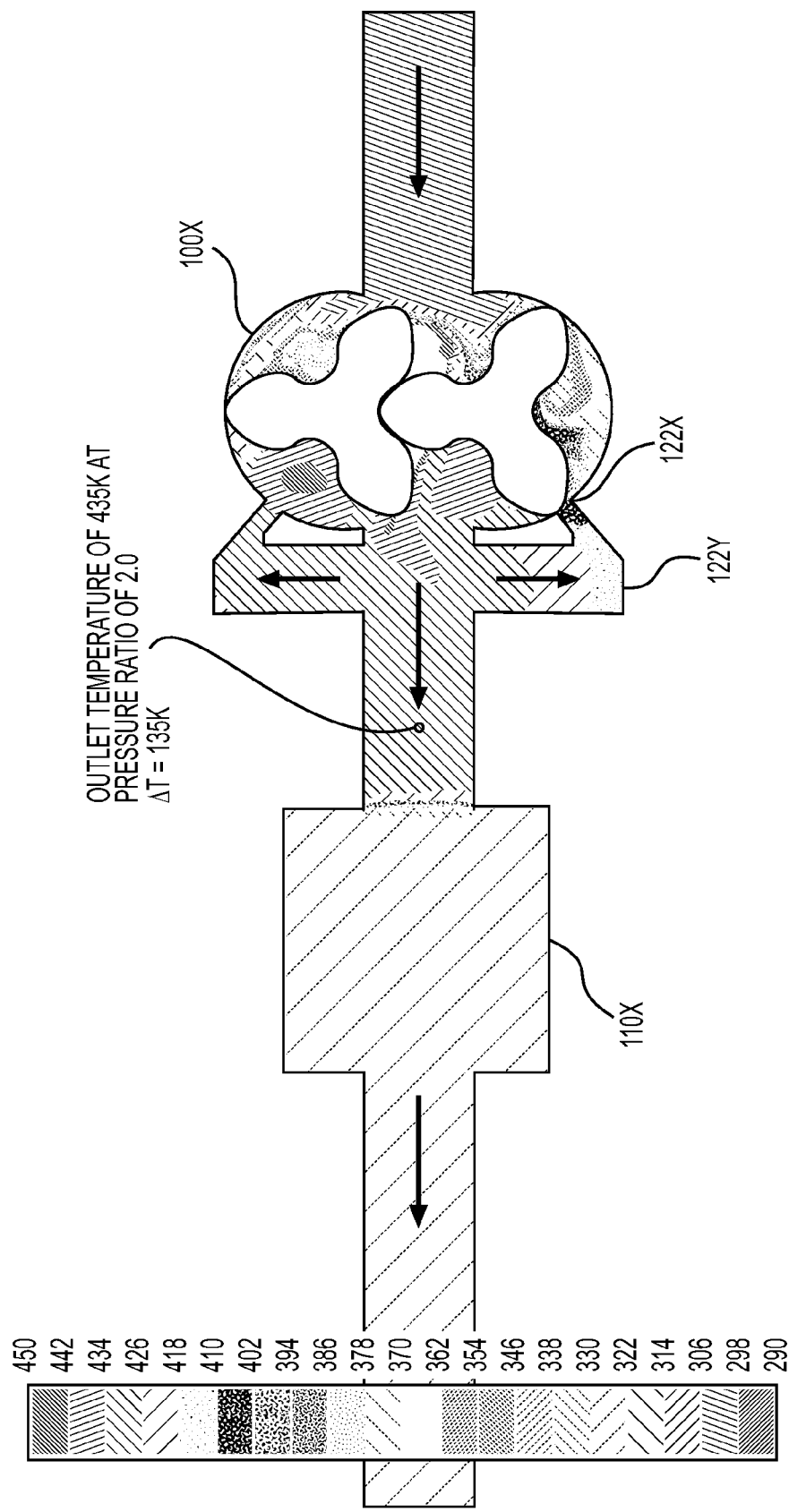
FIG. 4A is a simulation result showing the temperature distribution of a supercharger without backflow of cooled air.
Figure 4B:
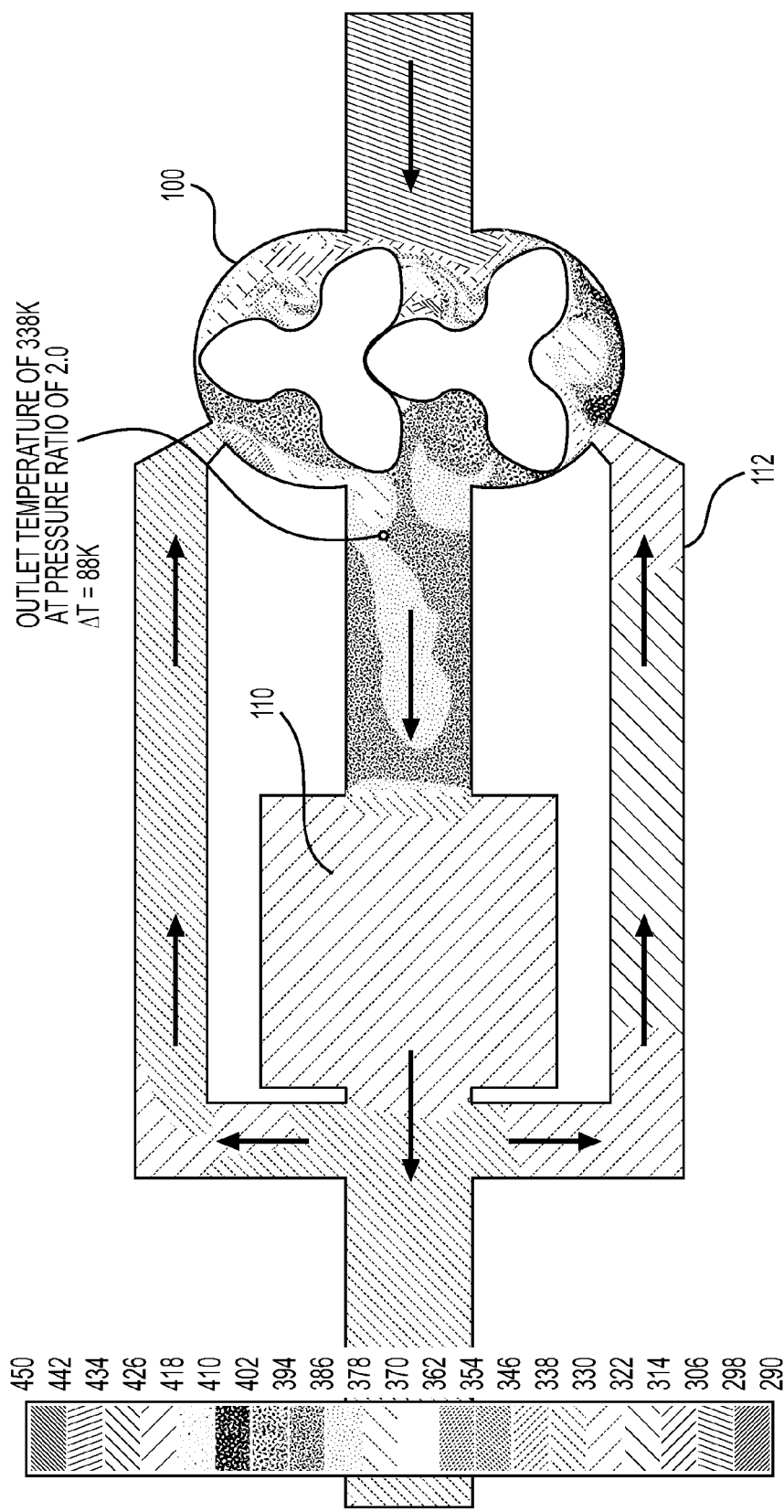
FIG. 4B is a simulation result showing the temperature distribution of a supercharger with backflow of cooled air.

In addition to the experiment testing the effect of cooled backflow air on pressure ratio, the effect of backflow on temperature was simulated. Comparing FIGS. 4A and 4B shows the effect of the cooled air on the temperature of the air at the outlet of the supercharger. The simulation was conducted at the supercharger speed of 6000 RPM. FIG. 4A shows the simulation results of the temperature distribution in the supercharger system without the cold air backflow. Air enters the supercharger 100X and is heated and expelled towards intercooler 110X. A backflow conduit 122Y allows expelled air to enter port 122X. The air is heated via the pumping action of supercharger 100X, so the expelled air is hot compared to the inlet temperature. The temperature distribution (K) within the supercharger system was simulated with given constants which include a pressure ratio of 2 and an inlet temperature of 300K. When measured, the outlet temperature was close to 435K, resulting in a temperature increase of 135K from inlet to outlet.

On the other hand, the supercharger system with cooled air backflow in FIG. 4B showed less temperature increase. Air entered supercharger 100 and was expelled to intercooler 110. After exiting the intercooler, cooled air traveled through conduit 112 to backflow in to supercharger 100. The outlet temperature was 388K, and thus, the net temperature increase was only 88K from inlet to outlet. Therefore, the backflow of cold air in the supercharger system reduced the temperature of the air at the outlet of the supercharger.

FIG. 5 shows a model of supercharger 100 that can be used in the supercharger systems 10, 11, and 12. Supercharger 100 is an axial inlet, radial outlet type. An air flow path is shown by arrows so that air entering an air inlet on the right side of the page exits out a triangular outlet 104 in the center of the page. A portion of the outer housing is removed to show inside main case 106. Supercharger 100 can be, for example, an M45 or other Roots type supercharger manufactured by Eaton Corporation, including its TVS® brand Twin Vortices Series type. FIG. 5 shows the cross section of the supercharger 100 having multiple radial flow backflow ports 122 communicating with each rotor. Supercharger 100 has two rotors 102, 103 having three lobes. Two rotors 102, 103 are placed in the housing chamber 105. Radial flow backflow ports 122 can be placed on each side of the outlet and near each rotor 102, 103. By placing the radial flow backflow ports 122 to direct air between adjacent lobes of each rotor, the cooled air can be effectively mixed with the intake air to lower the temperature of the air being transported out of the supercharger 100.

Radial flow backflow ports 122 and or axial flow backflow ports 1222 can be placed in the main case 106 of the tubular housing to interface with recirculation conduits 112. Main case 106 can be formed as a casting defining the inlet port 101, outlet port 104, and radial flow 122 and or axial flow backflow ports 1222. Main case 106 can comprise multiple sections integrated together, and main case 106 can be integrated with other housing sections to form an air envelope around the rotors, rotor mounts, gear case, and other operational features of supercharger 100.

The aspects detailed above for FIGS. 1A-10 are applicable to the thermal abatement systems below. FIGS. 11A-13B illustrate that the combustion process can be tuned for efficiency. Tuning the temperature of air flowing in a combustion system provides many benefits, such as fuel efficiency, efficient particulate filtering, and enhanced drivability of a motive device affiliated with such thermal abatement. FIGS. 11A-13B detail alternative thermal abatement systems with various flow paths for back flow of intercooled air, various optional and alternative uses of high or low pressure exhaust gas recirculation, and various air compression strategies. The alternative arrangements detailed above for bypass control, backflow control, conduit or manifold tuning, etc. apply equally to FIGS. 11A-13B.

FIGS. 11A-13B illustrate thermal abatement systems comprising an axial inlet, radial outlet supercharger. The main case 106 of the supercharger 100 is as described above, and comprises, for example, one to three sets of back ports, which can be one or both of axial flow back flow ports 1222 and radial flow back flow ports 122. One of intercoolers 110, 210 and 410 is connected to receive air, to cool the received air, and to expel the cooled air to the at least two back flow ports. Atmospheric air enters the main inlet 2000 to the thermal abatement systems. In addition to the back flow provided by conduits 112 & 112A-112C, the air is also compressed, cooled, optionally mixed with exhaust gas recirculation (EGR) gases via EGR conduits 3001 & 3003 and related ports, combusted by engine 120, and exhausted out main outlet 2001. Above line 2003, the air intake system is described, while below line 2003, the exhaust system is described. Computer control of the selective systems is outlined in FIGS. 2D-2F.

When the optional EGR strategies are implemented, various factors assist the induction and pressurized action of the EGR gas. It is possible to rely on pressure differences, aspiration, thermal gradients, etc. to route the EGR gas for further combustion. Various control strategies can thus be implemented to selectively route the EGR gas, as by valves and actuators controlled via feedback loops with sensors and processor implemented algorithms.

Figure 11A:
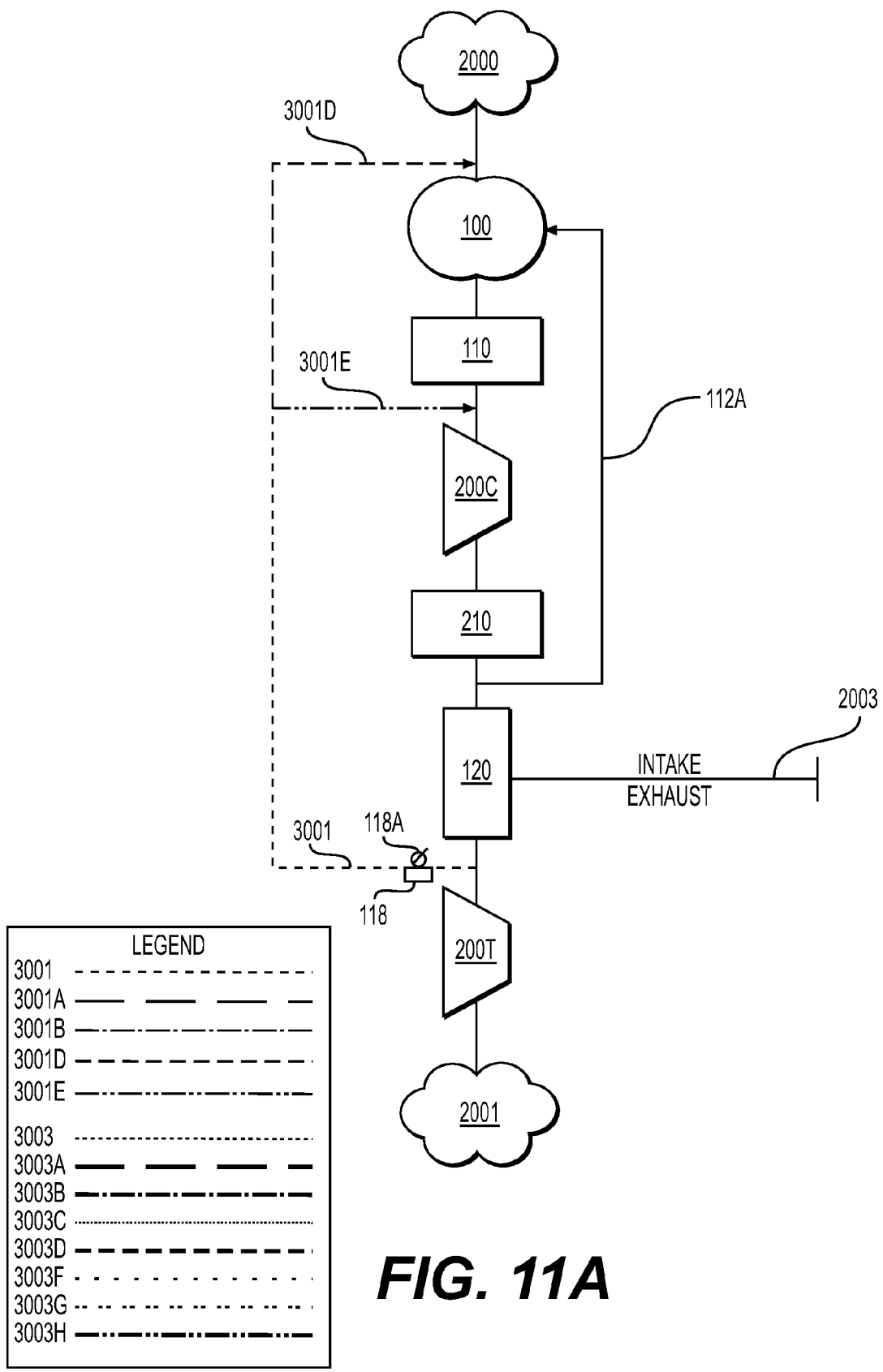
FIG. 11A-D are flow diagrams for thermal abatement systems comprising a supercharger boosting a turbocharger.

FIGS. 11A-11D illustrate thermal abatement systems wherein a supercharger boosts air, which is further boosted by a turbocharger. FIG. 11A shows a first alternative where air from the main inlet 2000 enters the supercharger 100, is output to intercooler 110 for cooling, is further compressed by turbocharger compressor 200C and cooled by intercooler 210. A backflow conduit 112A selectively provides cooled air from intercooler 210 to the backflow ports of supercharger 100.

An engine 120 is connected to receive the expelled cooled air from the intercooler 210 and further connected to expel exhaust. An EGR conduit 3001 is connected to selectively receive a portion of the expelled exhaust, as by computer control of an EGR valve 118A via EGR actuator 118. The optional EGR conduit 3001 is connected to an optional EGR input 3001D to return the received portion of the exhaust to the inlet of the supercharger 100. A remaining portion of the exhaust passes through the turbine 200T of the turbocharger. The exhaust spins the turbine 200T, which is connected to operate the compressor 200C. The exhaust exits the main outlet 2001 of the thermal abatement system.

Because the EGR conduit 3001 is prior to the turbine 200T, a backpressure can be created, as by control of an exhaust valve, or as by the action of the turbine 200T. The exhaust gas selected for EGR is considered "high pressure" because of the increase in pressure on the exhaust caused by the back pressure. Instead of inputting the EGR prior to the supercharger 100, other locations are suitable, such as alternative EGR input 3001E.

Many control strategies and alternative layouts are possible. For example, it is possible to selectively power supercharger 100 for desired boost conditions. For no or very low boost conditions, it is possible to run only one of supercharger 100 or turbine 200C, but to operate both supercharger 100 and compressor 200C for high boost conditions. The intercoolers 210 and 110 are also alternatively applied to cool the air so that only one or both are used based on conditions.

Figure 11B:
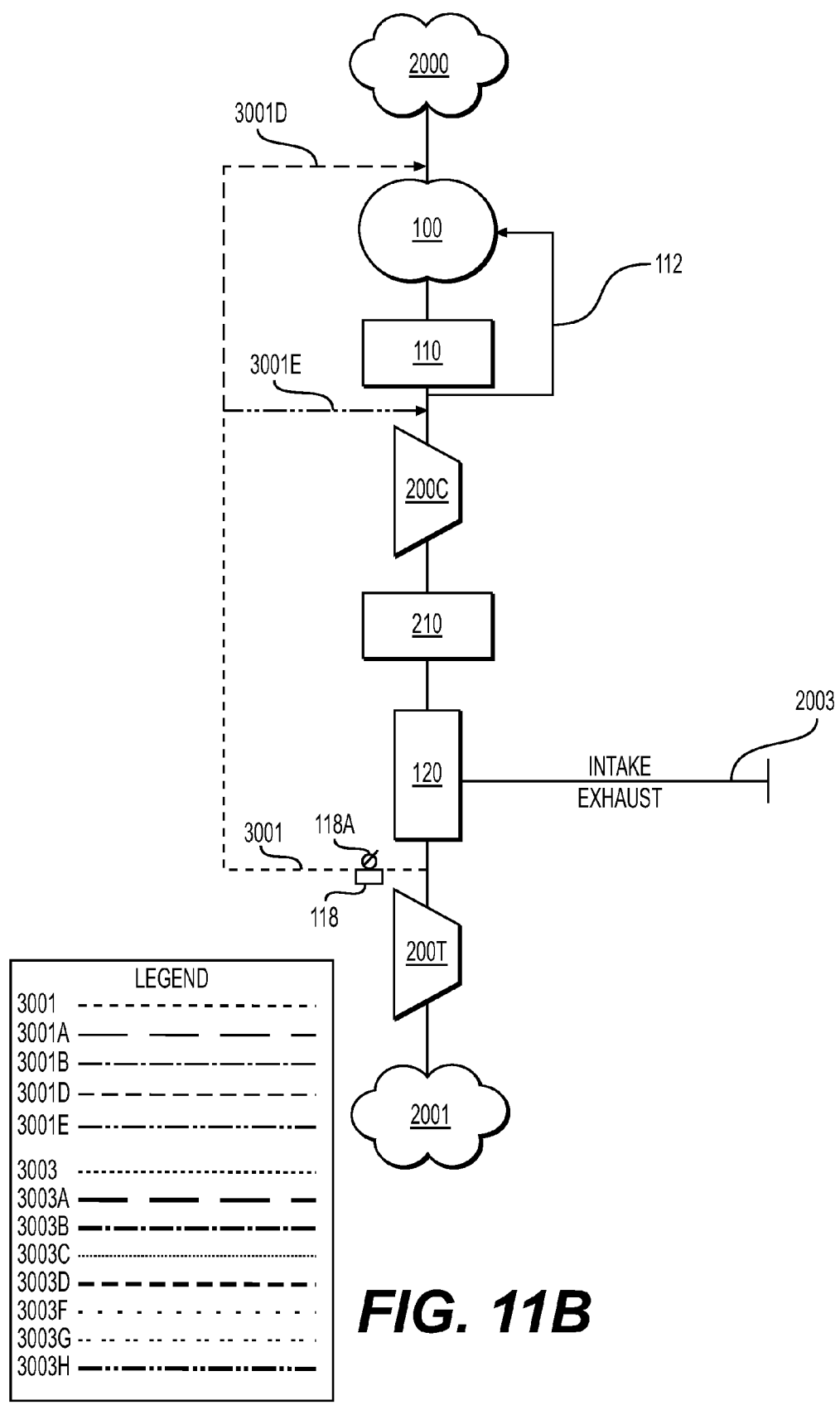
Figure 11C:
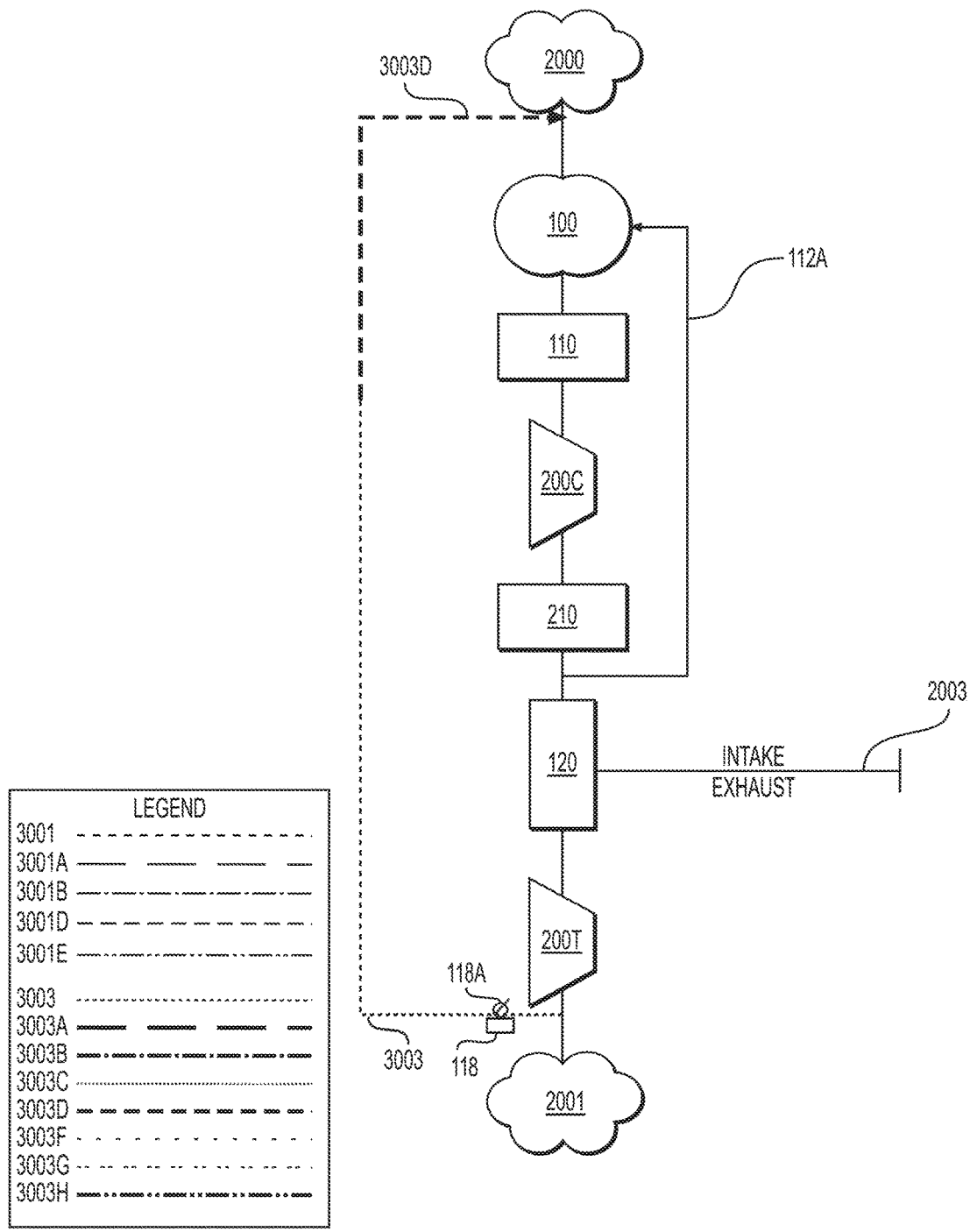

FIG. 11C shows a "low pressure" alternative to FIG. 11A. EGR gas is selectively diverted back for combustion after it exits the turbine 200T. Because there is little to no backpressure on the exhaust prior to the main outlet 2001, the EGR gas is directed to the atmospheric pressure or low pressure inlet 101 of supercharger 100 via EGR input 3003D.

FIG. 11B shows an alternative aspect for a supercharger boosting air to a turbocharger in a thermal abatement system. Aspects of FIG. 11B that are similar to FIG. 11A are not repeated. But, the back flow conduit 112 is connected between intercooler 110 and supercharger 100. The turbocharger compressor 200C supplies compressed air to intercooler 210, and the cooled air from intercooler 210 can directly supply air for combustion in engine 120. As above, pre-engine bypass of compressed air is possible at any point prior to the air reaching the combustion cylinders of engine 120. High pressure EGR is possible between EGR conduit 3001 and either of EGR inputs 3001D or 3001E.

Figure 11D:
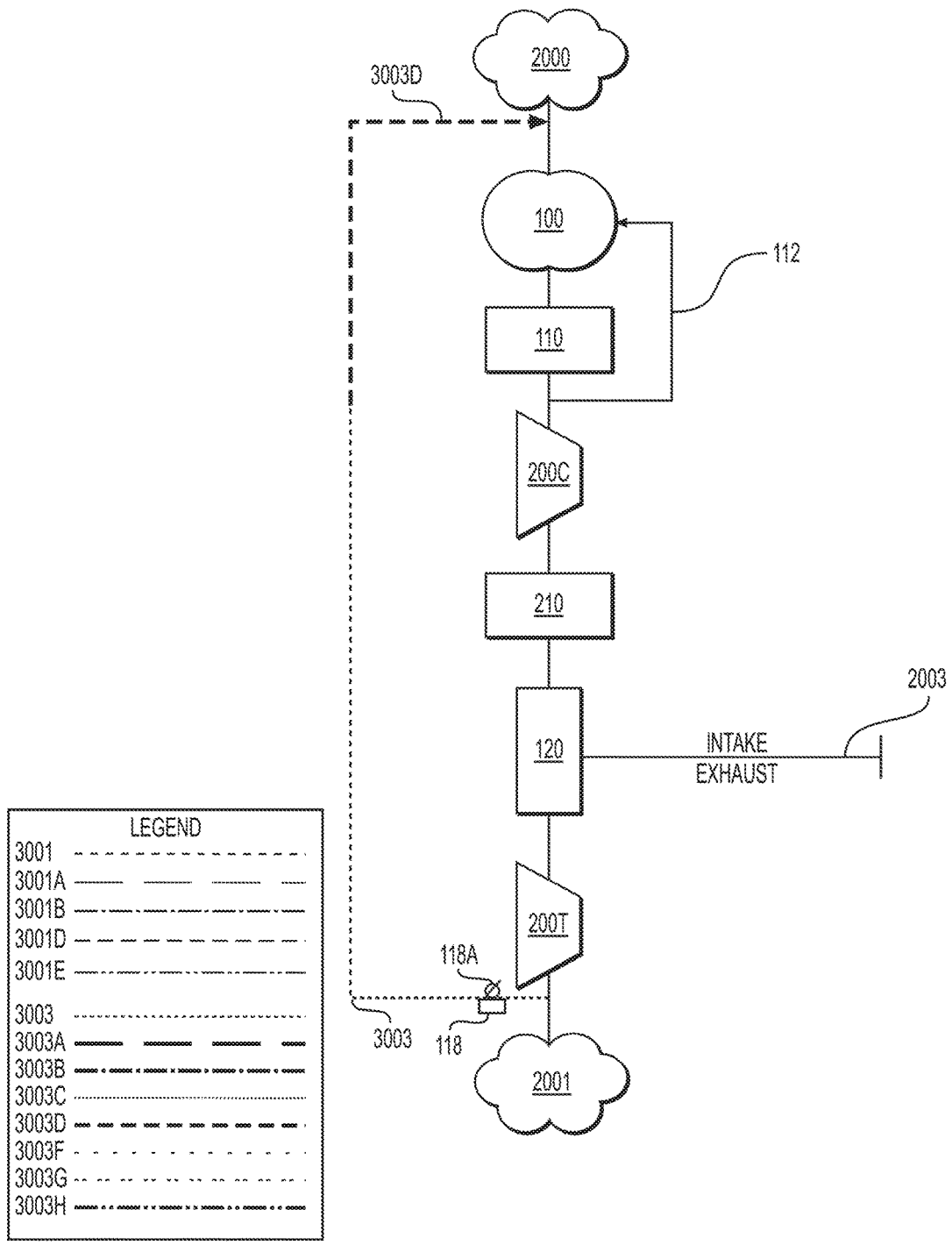

FIG. 11D is a low pressure alternative aspect of FIG. 11C. Bypass and back flow alternatives remain as above, but by connecting EGR conduit 3003 after the turbine, there is little to no backpressure on the exhaust prior to the main outlet 2001. The low to atmospheric pressure of the EGR gas is directed to the atmospheric pressure or low pressure inlet 101 of supercharger 100 via EGR input 3003D.

Figure 12A:
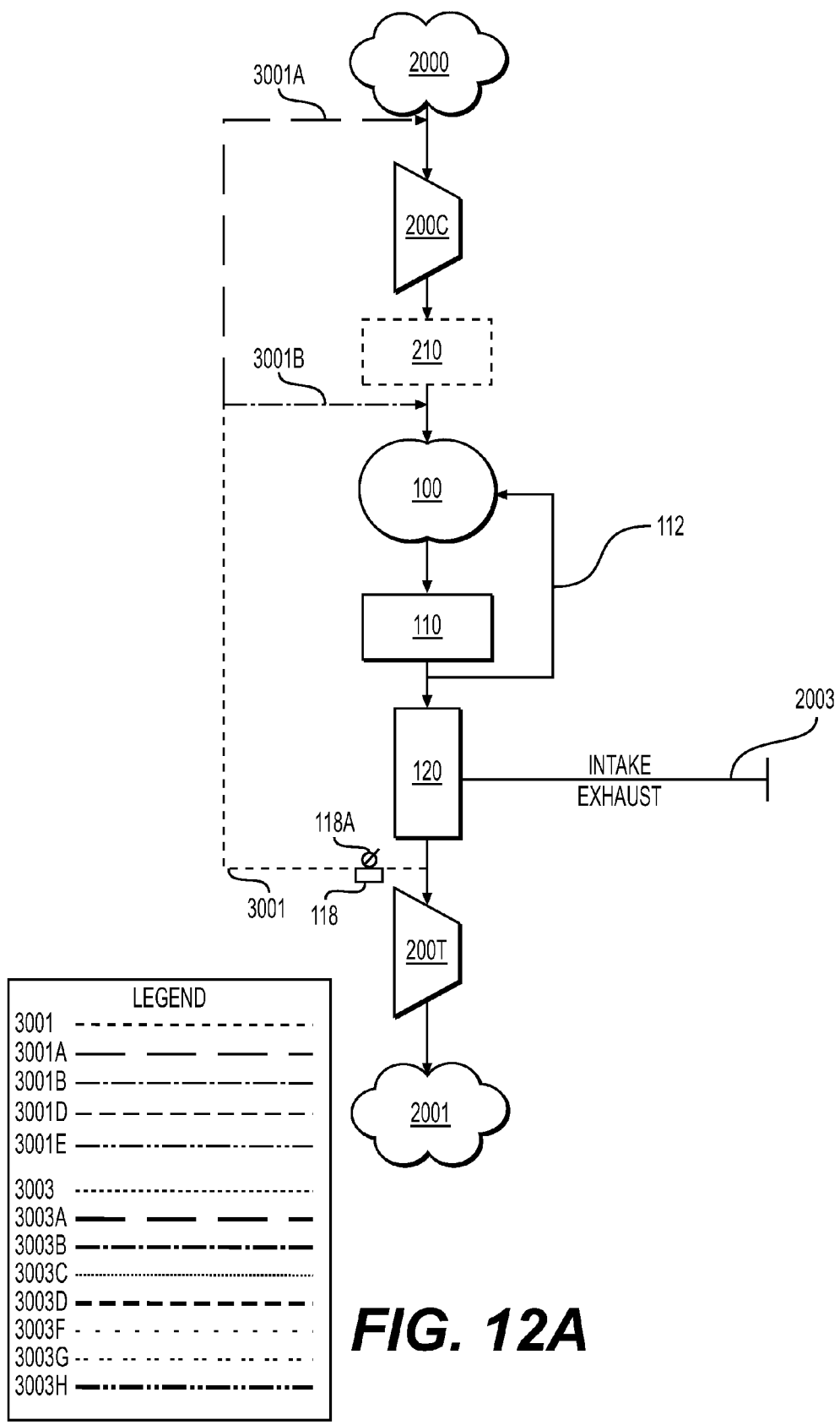
FIGS. 12A and 12B are flow diagrams for thermal abatement systems comprising a turbocharger boosting a supercharger.

Turning to FIG. 12A, a thermal abatement system implements a turbocharger fed supercharger. Atmospheric air is brought in main inlet 2000, where the compressor 200C of the turbocharger compresses the air. An optional intercooler 210 cools the compressed air, and it is connected to the inlet of supercharger 100. The supercharger blows the air to intercooler 110 and a portion of the cooled air is selectively directed via backflow conduit 112 to backflow ports in supercharger 100. Bypass and computer control of valve opening and closing are present.

Cooled air for combustion is directed from intercooler 110 to engine 120. Engine 120 expels exhaust to power the turbine 200T of the turbocharger and exhaust exits the main outlet 2001.

Optionally, the system of FIG. 12A comprises EGR conduit 3001. Because it is placed between the engine and turbine, the EGR gas is subject to backpressure and or valve control to create "high pressure" EGR. Alternative EGR ports 3001A and 3001B permit EGR gas to be inserted back in to the system before or after the optional intercooler 210.

Many control strategies and alternative layouts are possible. For example, it is possible to selectively power supercharger 100 for desired boost conditions. For no or very low boost conditions, it is possible to run only one of supercharger 100 or turbine 200C, but to operate both supercharger 100 and compressor 200C for high boost conditions. The intercoolers 210 and 110 are also alternatively applied to cool the air so that only one or both are used based on conditions.

Figure 12B:
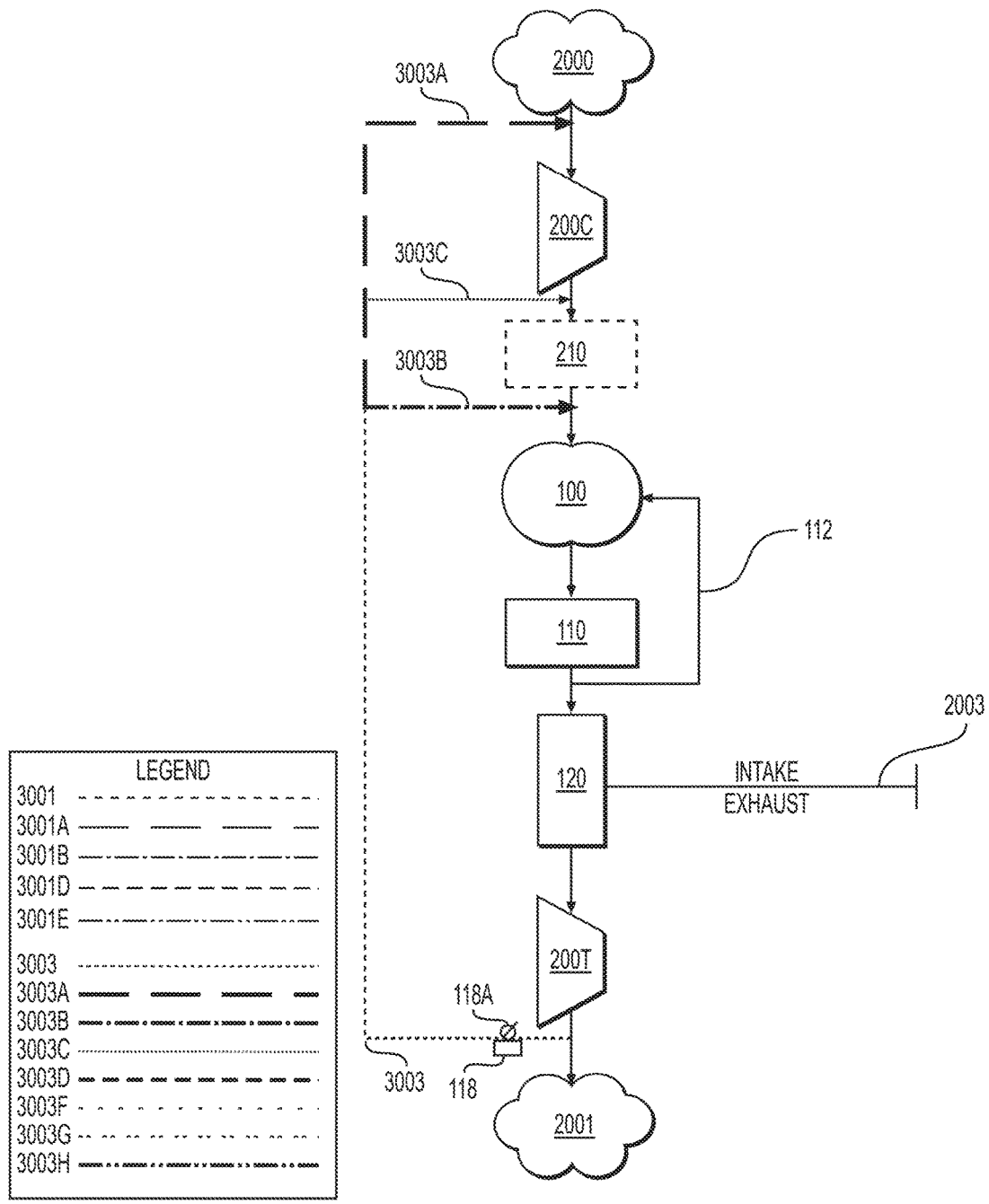

FIG. 12B is an alternative aspect of FIG. 12A using "low pressure" EGR. The EGR conduit 3003 is attached after the turbine 200T, and the low to no pressure exhaust gas can be routed for further combustion to any one of alternative EGR ports 3003A, 3003B, or 3003C.

Figure 13A:
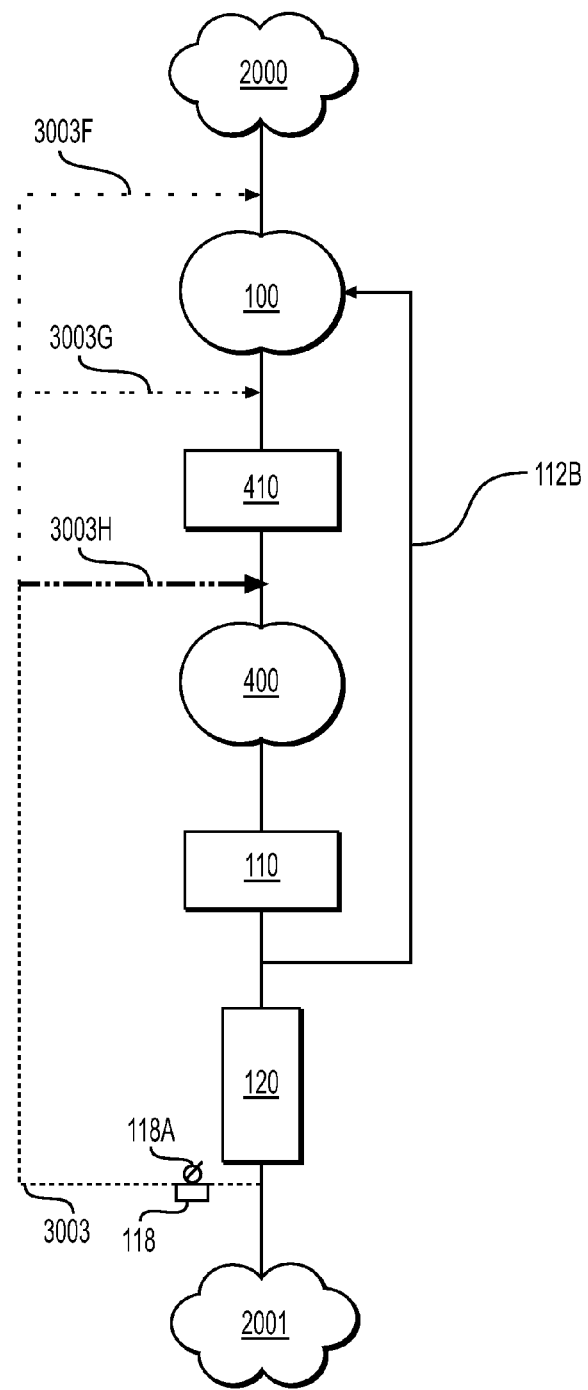
FIGS. 13A and 13B are flow diagrams for thermal abatement systems comprising a supercharger boosting another supercharger.

FIG. 13A shows a thermal abatement system having a supercharger 400 fed by another supercharger 100. Air enters main inlet 2000 and is blown or passed through supercharger 100. The air then enters intercooler 410 where it is cooled prior to use or passage through supercharger 400. Another intercooler 110 is connected to provide further cooling prior to entry to engine 120. A selective portion of cooled air from intercooler 110 is routed via backflow conduit 112B to supercharger 100 backflow ports.

Many control strategies and alternative layouts are possible. For example, it is possible to power only one of the superchargers 400 or 100 for low boost conditions and to power both superchargers 400 and 100 for high boost conditions. The intercoolers 410 and 110 are also alternatively applied to cool the air so that only one or both are used based on conditions. Because supercharger 400 is not connected to backflow conduits, it is possible to use a simplified supercharger with no backflow ports, thus providing a second source of boost while minimizing outlay costs.

FIG. 13A optionally includes EGR conduit 3003 to selectively route exhaust for EGR. The EGR gas can be inserted for further combustion via any one of EGR ports 3003F, 3003G, & 3003H.

Figure 13B:
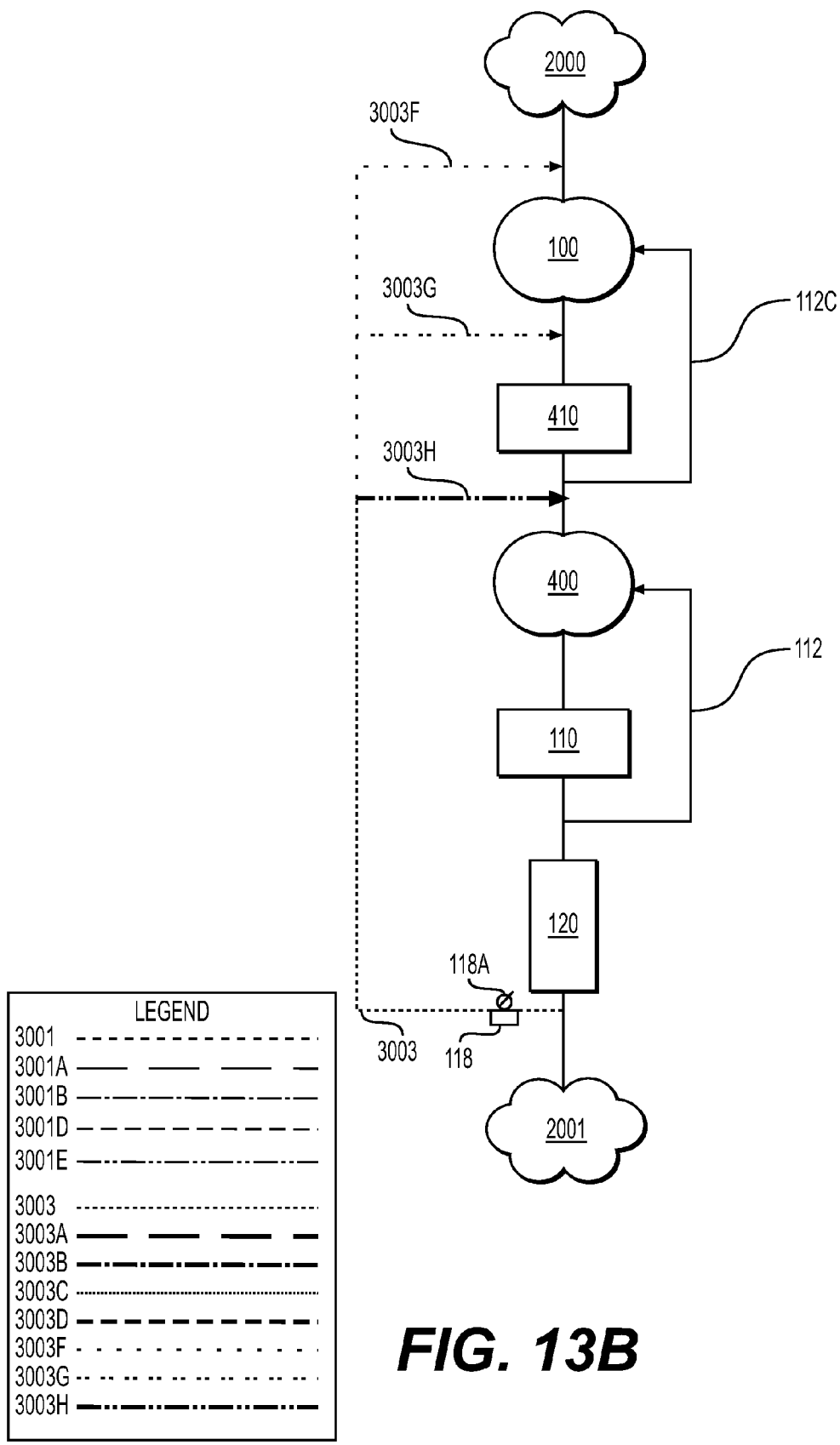

FIG. 13B shows an alternative aspect of FIG. 13A. Both supercharger 400 and supercharger 100 are designed to receive backflow from their respective intercoolers. Thus, intercooler 410 cools air, and a selective quantity of cooled air is connected via backflow conduit 112C to the backflow ports of supercharger 100. Likewise, intercooler 110 cools air, and a selective quantity of cooled air is connected via backflow conduit 112 to the backflow ports of supercharger 400.

Much like above for FIGS. 2A-2C, computer-implemented control for selecting the quantity and timing of backflow, bypass, and EGR is possible for FIGS. 11A-13B. Examples are shown in FIGS. 2D-2F.

The control mechanisms 24, 25, & 26 can be a part of an engine control unit (ECU), as explained above for control mechanisms 20-23. The control mechanisms 24-26 can include a controller 150, sensors 151, 152, 153, actuator 114 that operates valve 114A, and actuator 118 that operates valve 118. The actuators 114 & 118 can include sensors for collecting data on the opening degree of their affiliated valves. Additional options for using bypass actuator 115 and multi-way actuator 116 are illustrated, and implementation of their affiliated valves 115A & 116A are as above.

The number and placement of sensors can vary based on feedback control implemented, and so the system can have more or less sensors and actuators than in the illustrated example. For example, sensors 156 & 158 are shown in broken lines to indicate that they are optional and alternative depending upon application. If sensor 151 can sense information adequate to determine whether to implement EGR, such as exhaust quantity and flow rate, then an additional exhaust sensor may not be needed. But, it is possible to include one or more sensor capabilities in the exhaust flow path, to determine whether to implement EGR.

Like above, sensors 156 & 158 can be of a variety of types capable of sensing conditions and of sending signals, such as temperature, pressure, speed, or air flow (velocity). The illustrated sensors can include a plurality of types, such that a sensor can measure multiple conditions, such as both temperature and air flow.

The addition of the EGR valve 118A and actuator 118 permit further tailoring of temperature, pressure, fuel efficiency, etc. by permitting exhaust gas to recirculate. Selective heating and cooling of the combustion process thereby enhances compliance with CAFE fuel requirements, permits efficient charcoal canister use, and the other benefits detailed above.

In the preceding specification, various aspects of the present teachings have been described with reference to the accompanying drawings. It will, however, be evident that various other modifications and changes may be made thereto, and additional aspects may be implemented, without departing from the broader scope of the claims that follow. The specification and drawings are accordingly to be regarded in an illustrative rather than restrictive sense.

Other aspects of the present teachings will be apparent to those skilled in the art from consideration of the specification and by practice of the disclosure. For example, it is possible to have a main engine intercooler, such as intercooler 110, and additional intercoolers dedicated to each backflow conduit 112 or backflow port 122. It is intended that the specification and examples be considered as exemplary only, with the true scope of the invention being indicated by the following claims.

We claim:

1. A thermal abatement system, comprising:
   an axial inlet, radial outlet supercharger, comprising:
      a main case comprising at least two rotor bores, the main case further comprising an inlet plane and an outlet plane, wherein the inlet plane is perpendicular to the outlet plane;
      an inlet wall comprising an inner surface, the inner surface comprising two rotor mounting recesses, the inlet wall parallel to the inlet plane;
      an outlet in the outlet plane;
      an inlet in the inlet plane;
      at least two rotors configured to move air from the inlet to the outlet; and
      at least two backflow ports in the main case; and
   an intercooler connected to receive air expelled from the supercharger, to cool the received air, and to expel the cooled air to the at least two back flow ports.

2. A thermal abatement system, comprising:
   an axial inlet, radial outlet supercharger, comprising:
      a main case comprising at least two rotor bores, the main case further comprising an inlet plane and an outlet plane, wherein the inlet plane is perpendicular to the outlet plane;
      an inlet wall comprising an inner surface, the inner surface comprising two rotor mounting recesses, the inlet wall parallel to the inlet plane;
      an outlet in the outlet plane;
      an inlet in the inlet plane;
      at least two rotors configured to move air from the inlet to the outlet; and
      at least two backflow ports in the main case;
   an intercooler connected to receive air expelled from the supercharger, to cool the received air, and to expel a selective portion of the cooled air to the at least two back flow ports;
   an engine connected to receive another portion of the cooled air from the intercooler, the engine configured to combust the cooled air and expel exhaust; and
   an exhaust gas recirculation conduit connected to selectively receive a portion of the exhaust and further connected to input the exhaust back in to the thermal abatement system for additional combustion.

3. A thermal abatement system, comprising:
   an axial inlet positive displacement pump, comprising:
      a main case comprising:
         an outlet;
         a first rotor bore and a second rotor bore;
         an inlet wall comprising an inner surface, the inner surface comprising a first rotor mounting recess and a second rotor mounting recess;
         an inlet through the inlet wall; and
         at least two backflow ports in the main case;
      a first rotor mounted along a first rotor axis between the first rotor bore and the first rotor mounting recess, the first rotor configured to rotate about the first rotor axis to move gas from the inlet to the outlet along the first rotor axis; and
      a second rotor mounted along a second rotor axis between the second rotor bore and the second rotor mounting recess, the second rotor configured to rotate about the second rotor axis to move gas from the inlet to the outlet along the second rotor axis; and
   an intercooler connected to receive gas expelled from the positive displacement pump, to cool the received gas, and to expel the cooled gas to the at least two back flow ports.

4. The system of claim 3, wherein the at least two backflow ports are axial flow back flow ports through the inlet wall.

5. The system of claim 4, further comprising a front plate separated from the axial flow back flow ports and the inlet wall by a tuning distance.

6. The system of claim 4, wherein the first rotor comprises a first set of lobes that alternately block a first of the axial back flow ports as the first rotor rotates, and wherein the second rotor comprises a second set of lobes that alternately block a second of the axial back flow ports as the second rotor rotates, and wherein, when one of the first set of lobes blocks the first of the axial back flow ports, the second set of lobes are rotated to expose the second of the axial flow back flow ports to a gap between the second set of lobes.

7. The system of claim 3, wherein the outlet is on an outlet side of the main case, and wherein the at least two backflow ports are radial flow back flow ports on the outlet side of the main case.

8. The system of claim 3, wherein the at least two backflow ports are axial flow back flow ports through the inlet wall, and wherein the supercharger further comprises at least two radial flow back flow ports on an outlet side of the main case.

9. The system of claim 8, wherein the intercooler is further connected to expel cooled gas to the at least two radial flow back flow ports.

10. The system of claim 3, further comprising:
an engine connected to receive the expelled cooled gas from the intercooler and further connected to expel exhaust; and
an exhaust gas recirculation conduit connected to selectively receive a portion of the expelled exhaust, and the exhaust gas recirculation conduit is connected to return the received portion of the exhaust to the inlet of the supercharger.

11. The system of claim 3, further comprising:
an engine connected to receive the expelled cooled gas from the intercooler and further connected to expel exhaust;
a turbocharger, the turbocharger comprising a compressor and a turbine, the turbine connected to receive the expelled exhaust and to rotate in response to the expelled exhaust, the turbine further connected to operate the compressor, and the compressor is connected to expel gas to the intercooler prior to the engine; and
a second intercooler connected to cool gas passing between the supercharger and the compressor.

12. The system of claim 11, further comprising an exhaust gas recirculation conduit connected to selectively receive a portion of the expelled exhaust, and the exhaust gas recirculation conduit is connected to return the received portion of the exhaust to the inlet of the supercharger.

13. The system of claim 11, further comprising an exhaust gas recirculation conduit connected to selectively receive a portion of the expelled exhaust, and the exhaust gas recirculation conduit is connected to input the received portion of the exhaust to the compressor.

14. The system of claim 11, wherein the turbine further expels the received exhaust, and the system further comprises an exhaust gas recirculation conduit connected to selectively receive a portion of the exhaust expelled from the turbine, and the exhaust gas recirculation conduit is connected to input the received portion of the exhaust to the inlet of the supercharger.

15. The system of claim 3, further comprising:
an engine connected to receive the expelled cooled gas from the intercooler and further connected to expel exhaust;
a turbocharger, the turbocharger comprising a compressor and a turbine, the turbine connected to receive the expelled exhaust and to rotate in response to the expelled exhaust, the turbine further connected to operate the compressor, and the compressor is connected to expel gas to the intercooler prior to the engine; and
a second intercooler connected to cool gas passing between the compressor and the engine.

16. The system of claim 15, further comprising an exhaust gas recirculation conduit connected to selectively receive a portion of the expelled exhaust, and the exhaust gas recirculation conduit is connected to return the received portion of the exhaust to the inlet of the supercharger.

17. The system of claim 15, further comprising an exhaust gas recirculation conduit connected to selectively receive a portion of the expelled exhaust, and the exhaust gas recirculation conduit is connected to input the received portion of the exhaust to the compressor.

18. The system of claim 15, wherein the turbine further expels the received exhaust, and the system further comprises an exhaust gas recirculation conduit connected to selectively receive a portion of the exhaust expelled from the turbine, and the exhaust gas recirculation conduit is connected to input the received portion of the exhaust to the inlet of the supercharger.

19. The system of claim 3, further comprising:
an engine connected to receive the expelled cooled gas from the intercooler and further connected to expel exhaust; and
a turbocharger, the turbocharger comprising a compressor and a turbine, the turbine connected to receive the expelled exhaust and to rotate in response to the expelled exhaust, the turbine further connected to operate the compressor, and the compressor is connected to expel gas to the inlet of the supercharger.

20. The system of claim 19, further comprising a second intercooler connected to cool gas passing between the compressor and the supercharger.

21. The system of claim 20, further comprising an exhaust gas recirculation conduit connected to selectively receive a portion of the expelled exhaust, and the exhaust gas recirculation conduit is connected to input the received portion of the exhaust to the second intercooler.

22. The system of claim 19, further comprising an exhaust gas recirculation conduit connected to selectively receive a portion of the expelled exhaust, and the exhaust gas recirculation conduit is connected to input the received portion of the exhaust to the inlet of the supercharger.

23. The system of claim 19, wherein the turbine further expels the received exhaust, and the system further comprises an exhaust gas recirculation conduit connected to selectively receive a portion of the exhaust expelled from the turbine, and the exhaust gas recirculation conduit is connected to input the received portion of the exhaust in to the compressor.

24. The system of claim 19, wherein the turbine further expels the received exhaust, wherein the system further comprises a second intercooler connected to cool gas passing between the compressor and the supercharger, and wherein the system further comprises an exhaust gas recirculation conduit connected to selectively receive a portion of the exhaust expelled from the turbine, and the exhaust gas recirculation conduit is connected to input the received portion of the exhaust in to the second intercooler.

25. The system of claim 19, wherein the turbine further expels the received exhaust, and the system further comprises an exhaust gas recirculation conduit connected to selectively receive a portion of the exhaust expelled from the turbine, and the exhaust gas recirculation conduit is connected to input the received portion of the exhaust to the inlet of the supercharger.

26. The system of claim 3, further comprising:
a second supercharger connected to expel gas to the intercooler; and
a second intercooler connected to receive gas expelled from the supercharger, to cool the received gas, and to expel the cooled gas to the second supercharger.

27. The system of claim 26, further comprising:
an engine connected to receive expelled cooled gas from the intercooler and to expel exhaust, and
an exhaust gas recirculation conduit connected to selectively receive a portion of the expelled exhaust, and the exhaust gas recirculation conduit is connected to input the received portion of the exhaust in to the second supercharger.

28. The system of claim 26, further comprising:
an engine connected to receive expelled cooled gas from the intercooler and to expel exhaust, and
an exhaust gas recirculation conduit connected to selectively receive a portion of the expelled exhaust, and the exhaust gas recirculation conduit is connected to input the received portion of the exhaust in to the second intercooler.

29. The system of claim 26, further comprising:
an engine connected to receive expelled cooled gas from the intercooler and to expel exhaust, and
an exhaust gas recirculation conduit connected to selectively receive a portion of the expelled exhaust, and the exhaust gas recirculation conduit is connected to input the received portion of the exhaust in to the input of the supercharger.

30. The system of claim 3, further comprising:
a second supercharger comprising second backflow ports, the second supercharger connected to receive gas and to expel gas; and
a second intercooler connected to receive gas expelled from the second supercharger, to cool the received gas, to expel the cooled gas to the supercharger, and to selectively expel a portion of the cooled gas to the second backflow ports.

31. The system of claim 30, further comprising:
an engine connected to receive expelled cooled gas from the intercooler and to expel exhaust, and
an exhaust gas recirculation conduit connected to selectively receive a portion of the expelled exhaust, and the exhaust gas recirculation conduit is connected to input the received portion of the exhaust in to the second supercharger.

32. The system of claim 30, further comprising:
an engine connected to receive expelled cooled gas from the intercooler and to expel exhaust, and
an exhaust gas recirculation conduit connected to selectively receive a portion of the expelled exhaust, and the exhaust gas recirculation conduit is connected to input the received portion of the exhaust in to the second intercooler.

33. The system of claim 30, further comprising:
an engine connected to receive expelled cooled gas from the intercooler and to expel exhaust, and
an exhaust gas recirculation conduit connected to selectively receive a portion of the expelled exhaust, and the exhaust gas recirculation conduit is connected to input the received portion of the exhaust in to the input of the supercharger.

34. A thermal abatement system, comprising:
an axial inlet positive displacement pump, comprising:
 a main case comprising:
  an outlet;
  a first rotor bore and a second rotor bore;
  an inlet wall comprising an inner surface, the inner surface comprising a first rotor mounting recess and a second rotor mounting recess;
  an inlet through the inlet wall; and
  at least two backflow ports through the inlet wall;
 a first rotor mounted along a first rotor axis between the first rotor bore and the first rotor mounting recess, the first rotor configured to rotate about the first rotor axis to move gas from the inlet to the outlet along the first rotor axis and radially towards the outlet; and
 a second rotor mounted along a second rotor axis between the second rotor bore and the second rotor mounting recess, the second rotor configured to rotate about the second rotor axis to move gas from the inlet to the outlet along the second rotor axis and radially towards the outlet.

* * * * *